(12) United States Patent
Beisel

(10) Patent No.: US 11,635,337 B2
(45) Date of Patent: Apr. 25, 2023

(54) SENSOR FAILURE DIAGNOSIS IN A PUMP MONITORING SYSTEM

(71) Applicant: HALLIBURTON ENERGY SERVICES, INC., Houston, TX (US)

(72) Inventor: Joseph A. Beisel, Duncan, OK (US)

(73) Assignee: Halliburton Energy Services, Inc., Houston, TX (US)

( * ) Notice: Subject to any disclaimer, the term of this patent is extended or adjusted under 35 U.S.C. 154(b) by 344 days.

(21) Appl. No.: 16/755,734

(22) PCT Filed: Dec. 29, 2017

(86) PCT No.: PCT/US2017/068877
§ 371 (c)(1),
(2) Date: Apr. 13, 2020

(87) PCT Pub. No.: WO2019/132952
PCT Pub. Date: Jul. 4, 2019

(65) Prior Publication Data
US 2020/0333210 A1 Oct. 22, 2020

(51) Int. Cl.
*G01M 1/22* (2006.01)
*G08B 21/18* (2006.01)
(Continued)

(52) U.S. Cl.
CPC ............. *G01M 1/22* (2013.01); *G01H 1/00* (2013.01); *G01M 99/00* (2013.01); *G08B 21/18* (2013.01); *E21B 43/2607* (2020.05); *F04B 51/00* (2013.01)

(58) Field of Classification Search
CPC ...... E21B 43/12; E21B 43/26; E21B 43/2607; F04B 15/02; F04B 49/00; F04B 49/10;
(Continued)

(56) References Cited

U.S. PATENT DOCUMENTS 5,170,433 A 12/1992 Elliott et al.
6,882,960 B2 4/2005 Miller
(Continued)

FOREIGN PATENT DOCUMENTS

JP 2003503784 A 1/2003
WO WO-2017018112 A1 * 2/2017 ............. G01H 1/006
(Continued)

OTHER PUBLICATIONS

WO-2017018112-A1 (Year: 2017).*

*Primary Examiner* — Judy Nguyen
*Assistant Examiner* — Martin Walter Braunlich
(74) *Attorney, Agent, or Firm* — Kilpatrick Townsend & Stockton LLP

(57) ABSTRACT

A pump monitoring system for use in wellbore operations can determine whether an indication of a failure is due to an actual pump issue or a failed sensor. The pump monitoring system includes a sensor on a fluid end of a pump to measure properties associated with the pump and a vibration detector. A computing device executes instructions to receive the sensor signal and the vibration signal and identify an irregularity in the sensor signal. The processor then determines whether an operational signal component is present in the vibration signal, and displays an indication that the sensor has failed when the operational signal component is not present in the vibration signal. If the operational signal component is present in the vibration signal, the irregularity is likely caused by a pump problem such as a failed valve.

20 Claims, 18 Drawing Sheets

(51) Int. Cl.
*G01H 1/00* (2006.01)
*G01M 99/00* (2011.01)
*E21B 43/26* (2006.01)
*F04B 51/00* (2006.01)

(58) Field of Classification Search
CPC ......... F04B 49/065; F04B 51/00; G01H 1/00; G01H 17/00; G01M 1/22; G01M 99/00; G05B 23/02; G08B 21/18
See application file for complete search history.

(56) References Cited

U.S. PATENT DOCUMENTS

| | | | | |
|---|---|---|---|---|
| 7,099,782 | B2* | 8/2006 | Hitchcock | G01H 1/003 |
| | | | | 73/598 |
| 7,623,986 | B2 | 11/2009 | Miller | |
| 8,708,664 | B2* | 4/2014 | Brookbank | G01N 29/2418 |
| | | | | 385/98 |
| 8,746,353 | B2* | 6/2014 | Forsberg | F04D 13/10 |
| | | | | 166/250.15 |
| 9,063,856 | B2* | 6/2015 | Agnihotram | G06F 11/0793 |
| 2004/0151581 | A1 | 8/2004 | Hellmann et al. | |
| 2005/0072239 | A1 | 4/2005 | Longsdorf et al. | |
| 2010/0300683 | A1* | 12/2010 | Looper | E21B 21/06 |
| | | | | 166/250.01 |
| 2011/0002795 | A1 | 1/2011 | Brookbank | |

FOREIGN PATENT DOCUMENTS

| | | |
|---|---|---|
| WO | 2017039692 A1 | 3/2017 |
| WO | 2017039695 A1 | 3/2017 |
| WO | 2017039698 A1 | 3/2017 |
| WO | 2017039700 A1 | 3/2017 |
| WO | 2017039701 A1 | 3/2017 |
| WO | 2017058161 A1 | 4/2017 |
| WO | 2018044288 A1 | 3/2018 |
| WO | 2018044289 A1 | 3/2018 |
| WO | 2018044293 A1 | 3/2018 |
| WO | 2018052398 A1 | 3/2018 |
| WO | 2018052425 A1 | 3/2018 |

* cited by examiner

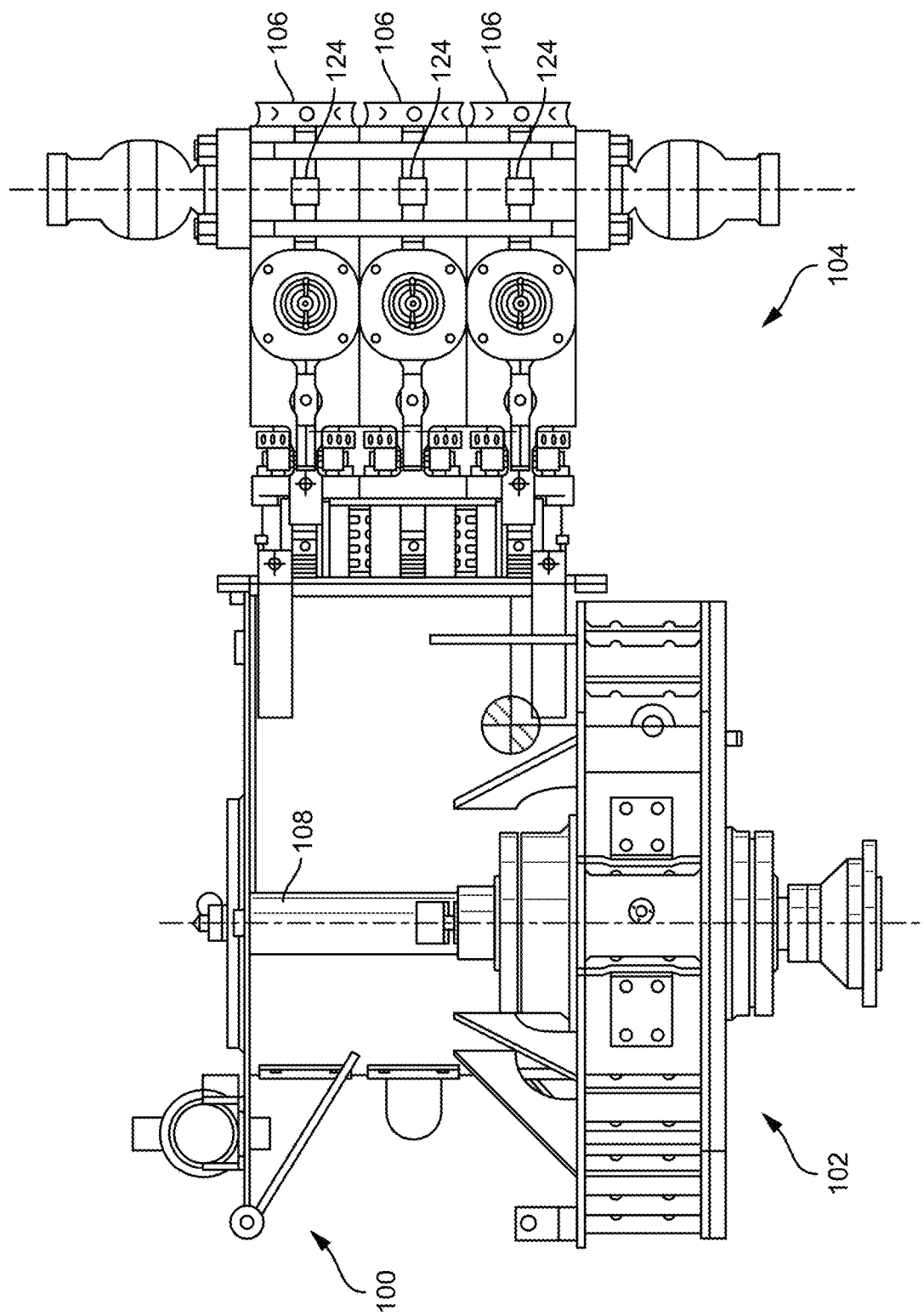

SENSOR FAILURE DIAGNOSIS IN A PUMP MONITORING SYSTEM

TECHNICAL FIELD

The present disclosure relates generally to pressure pumps and, more particularly (although not necessarily exclusively), to using signal processing to identify a failed sensor.

BACKGROUND

Pressure pumps may be used in wellbore treatments. For example, hydraulic fracturing may utilize a pressure pump to introduce or inject fluid at high pressures into a wellbore to create cracks or fractures in downhole rock formations. A processor-based pump monitoring system can be used to detect problems such as possible failures or poor pump performance by measuring such properties as strain, position, torque, and flow. When an indicator or signal graph indicates a problem, maintenance personnel can investigate the cause and take corrective action. The time taken to investigate the problem results in downtime from the pumping operations. Sometimes, parts are unnecessarily replaced when the time needed to specifically isolate the problem is significant, adding to the cost of maintenance operations. For example, sometimes parts of a pump section are replaced when the problem indicator is due to a failed sensor.

BRIEF DESCRIPTION OF THE DRAWINGS

FIG. 1A is a cross-sectional, top view schematic diagram depicting an example of a pressure pump that may be connected to a pump monitoring system according to one aspect of the present disclosure.

DETAILED DESCRIPTION

Figure 1B:
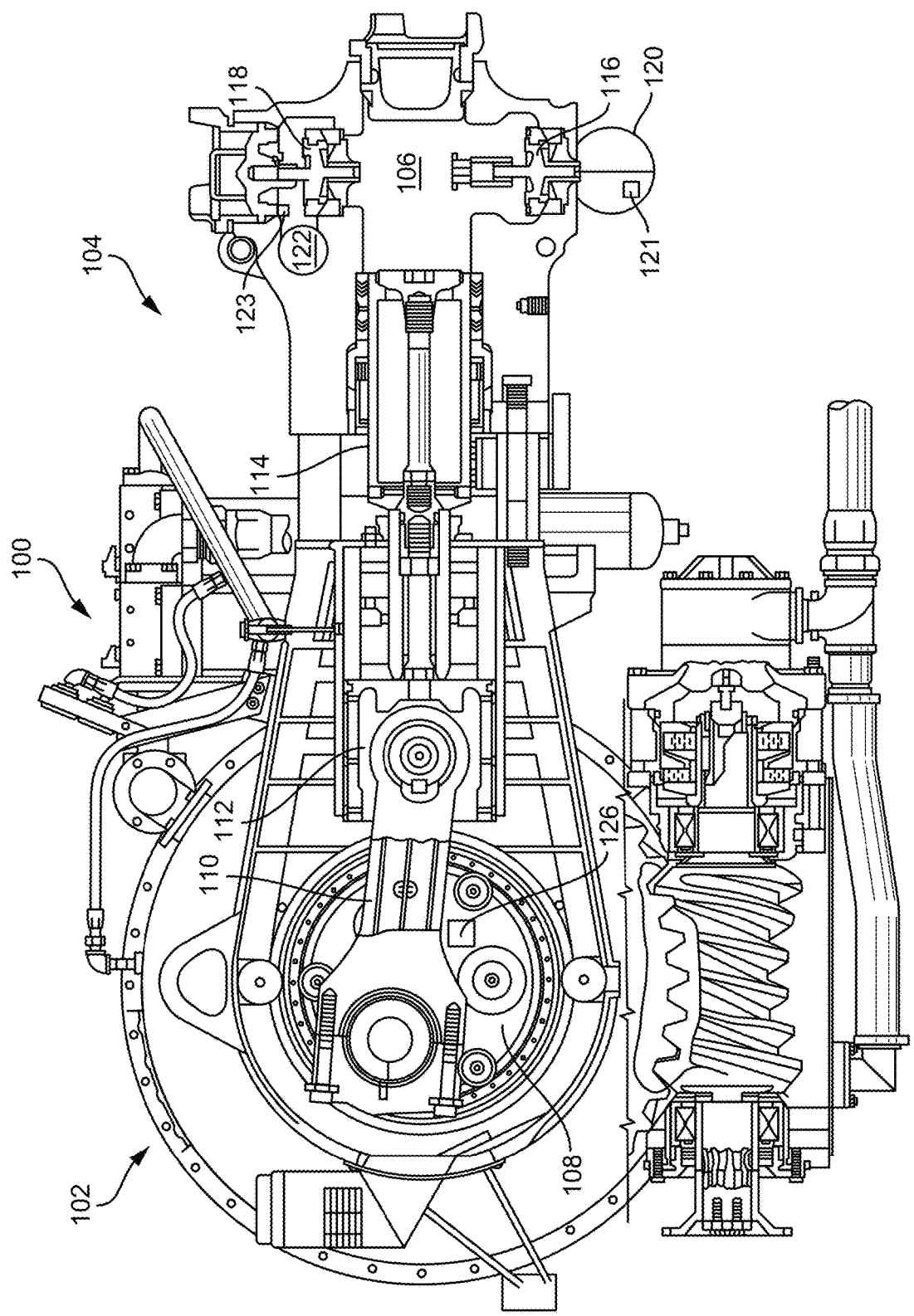
FIG. 1B is a cross-sectional, side view schematic diagram depicting the pressure pump of FIG. 1A according to one aspect of the present disclosure.

Certain aspects of the present disclosure relate to a pump monitoring system that can determine whether an indication of a failure is due to an actual pump issue or other phenomena, such as failed or failing sensor. While the sensors used for pump monitoring, if installed properly, are very robust, the installation process can be problematic for field or camp installation and repair. A typical sensor failure includes a de-bonding of the sensor form the target, which is typically a portion of the fluid end of a pump. This de-bonding can be total or partial, and can cause the system to incorrectly indicate various degrees of valve failure. By adding one or more additional measurements to the pump monitoring system, a sensor that has failed either by becoming de-bonded or for any other reason can be positively identified so that specific corrective action can be taken.

The enhanced ability for a pump monitoring system to self-diagnose results in part from the addition of a robust vibration detector. The corresponding pump failure that is typically indicated when a sensor comes loose is a totally blown valve. A totally blown valve will create a unique vibration signature that is timed to the pump. If this vibration signature is present along with the failure indication, an operator can assume with substantial certainty that the pump monitoring system is functioning properly and that the failure indication is accurate. If the vibration signature is not present, then a warning message to perform maintenance on a specific sensor can be delivered to the operator in the form of an indication that a sensor has failed.

Automated detection of bad sensors helps reduce maintenance time and costs for a pump monitoring system. It may also be possible to eliminate scheduled sensor checks and valve checks as part of the maintenance of a pump. Pump maintenance can be based on insert life, appearance, and the wear of the steel valve body and seat. The wear on these components is steady and gradual and can be observed to estimate remaining life on these components. Making use of the diagnostic technique described herein can increase the possibility of completing a well without regularly scheduled maintenance, only changing valves or checking sensors when needed or between jobs.

In some examples, a pump monitoring system for use in wellbore operations includes a sensor on a fluid end of a pump to measure properties associated with the pump and provide a sensor signal, as well as a vibration detector to measure vibration associated with the pump and provide a vibration signal. A computing device can be connected to the sensor and the vibration detector, and includes a processor that can execute instructions to receive the sensor signal and the vibration signal and identify an irregularity in the sensor signal. The processor then determines whether an operational signal component is present in the vibration signal, and displays an indication that the sensor has failed when the operational signal component is absent from the vibration signal. If the operational signal component is present in the vibration signal, the irregularity is likely caused by a pump problem such as a failed valve.

In some examples, determining whether the operational signal component is present in the vibration signal further includes detecting a square wave like component in the vibration signal. In some examples, the square wave like component is detected by applying an order tracking filter to the vibration signal. In examples, the square wave like component is detected by correlating the vibration signal to a strain signal. The vibration detector can include, as examples, an accelerometer, an acoustic transducer, a vibration transducer, or a torque transducer positionable at a torque input for a pump section that includes the sensor.

These illustrative examples are given to introduce the reader to the general subject matter discussed here and are not intended to limit the scope of the disclosed concepts. The following sections describe various additional features and examples with reference to the drawings in which like numerals indicate like elements, and directional descriptions are used to describe the illustrative aspects but, like the illustrative aspects, should not be used to limit the present disclosure.

These illustrative examples are given to introduce the reader to the general subject matter discussed here and are not intended to limit the scope of the disclosed concepts. The following sections describe various additional features and examples with reference to the drawings in which like numerals indicate like elements, and directional descriptions are used to describe the illustrative aspects but, like the illustrative aspects, should not be used to limit the present disclosure.

FIG. 1A and FIG. 1B show views of an example pressure pump 100 that is being monitored by a pump monitoring system according to certain aspects of the present disclosure. The pressure pump 100 is a positive displacement pressure pump. The pressure pump 100 includes a power end 102 and a fluid end 104. The power end 102 is coupled to a motor, engine, or other prime mover for operation. The fluid end 104 includes chambers 106 for receiving and discharging fluid flowing through the pressure pump 100. Although FIG. 1A shows three chambers 106 in the pressure pump 100, a pressure pump may include any number of chambers 106, including one, without departing from the scope of the present disclosure. In the examples presented herein, chambers 106 are sometimes also referred to as "cylinders."

The pressure pump 100 includes a rotating assembly. The rotating assembly includes a crankshaft 108, one or more connecting rods 110, a crosshead 112, plungers 114, and related elements (e.g., pony rods, clamps, etc.). The crankshaft 108 is positioned on the power end 102 of the pressure pump 100 and is mechanically connected to a plunger in a chamber 106 of the pressure pump via the connecting rod 110 and the crosshead 112. The crankshaft 108 may include an external casing or crankcase. The crankshaft 108 causes a plunger 114 located in a chamber 106 to displace any fluid in the chamber 106. In some aspects, each chamber 106 of the pressure pump 100 includes a separate plunger 114, and each plunger 114 in each chamber 106 is mechanically connected to the crankshaft 108 via the connecting rod 110 and the crosshead 112. Each chamber 106 includes a suction valve 116 and a discharge valve 118 for absorbing fluid into the chamber 106 and discharging fluid from the chamber 106, respectively. A chamber 106, suction valve 116, discharge valve 118 and their associated manifold portions may be referred to as a pump section. The fluid is absorbed into and discharged from the chamber 106 in response to a movement of the plunger 114 in the chamber 106.

A suction valve 116 and a discharge valve 118 are included in each chamber 106 of the pressure pump 100. In some aspects, the suction valve 116 and the discharge valve 118 are passive valves though the process described herein would work for driven valves as well. As the plunger 114 operates in the chamber 106, the plunger 114 imparts motion and pressure to the fluid by direct displacement. The suction valve 116 and the discharge valve 118 open and close based on the displacement of the fluid in the chamber 106 by the operation of the plunger 114. The suction valve 116 is opened during a recession of the plunger 114 to provide absorption of fluid from outside of the chamber 106 into the chamber 106. As the plunger 114 is withdrawn from the chamber 106, a partial suction is created to open the suction valve 116 to allow fluid to enter the chamber 106. The fluid is absorbed into the chamber 106 from an inlet manifold 120. Fluid already in the chamber 106 moves to fill the space where the plunger 114 was previously located in the chamber 106. The discharge valve 118 is closed during this process. These operations cause mechanical vibrations. Block 121 is a mounting position for an accelerometer to provide a vibration signal as part of a pump monitoring system, as described later.

The discharge valve 118 is opened as the plunger 114 moves forward or reenters the chamber 106. As the plunger 114 moves further into the chamber 106, the fluid is pressurized. The suction valve 116 is closed during this time to allow the pressure on the fluid to force the discharge valve 118 to open and discharge fluid from the chamber 106. The discharge valve 118 discharges the fluid into a discharge manifold 122. The loss of pressure inside the chamber 106 allows the discharge valve 118 to close. Together, the suction valve 116 and the discharge valve 118 operate to provide the fluid flow in a desired direction. The process may include a measurable amount of pressure and stress in the chamber 106, the stress resulting in strain to the chamber 106 or fluid end 104 of the pressure pump 100. The pump monitoring system, if coupled to the pressure pump 100 gauges the strain. Block 123 shows an example placement point for a discharge pressure transducer, mounted in the discharge manifold 122. This pressure transducer measures pressure in the discharge manifold. A similar pressure transducer (not visible) is mounted in the inlet manifold and measures the pressure in the suction manifold. It can be said that on the discharge side the valves must hold the discharge pressure back, and on the suction side, the suction pressure is what is supplying the suction valve.

In certain aspects, a pump monitoring system is coupled to the pressure pump 100 to gauge the strain and determine actuation of the suction valve 116 and the discharge valve 118. The pump monitoring system, as described herein, can also specifically identify failed valves and failed sensors. An example pump monitoring system as described herein includes strain gauges positioned on an external surface of the fluid end 104 to gauge strain in the chambers 106. Blocks 124 in FIG. 1A show example placements for each of the strain gauges. In some aspects, a monitoring system includes one or more position sensors for sensing the position of the crankshaft 108. Measurements of the crankshaft position may allow the monitoring system to determine the position of the plungers 114 in the respective chambers 106. A position sensor of the monitoring system may be positioned on an external surface of the pressure pump 100. Block 126 shows an example placement of a position sensor on an external surface of the power end 102 to sense the position of the crankshaft 108. In some aspects, measurements from the position sensor may be correlated with the measurements from the strain gauges to determine actuation delays corresponding to the valves 116, 118 in each chamber 106 of the pressure pump 100 for identifying cavitation in the fluid end 104.

Figure 2:
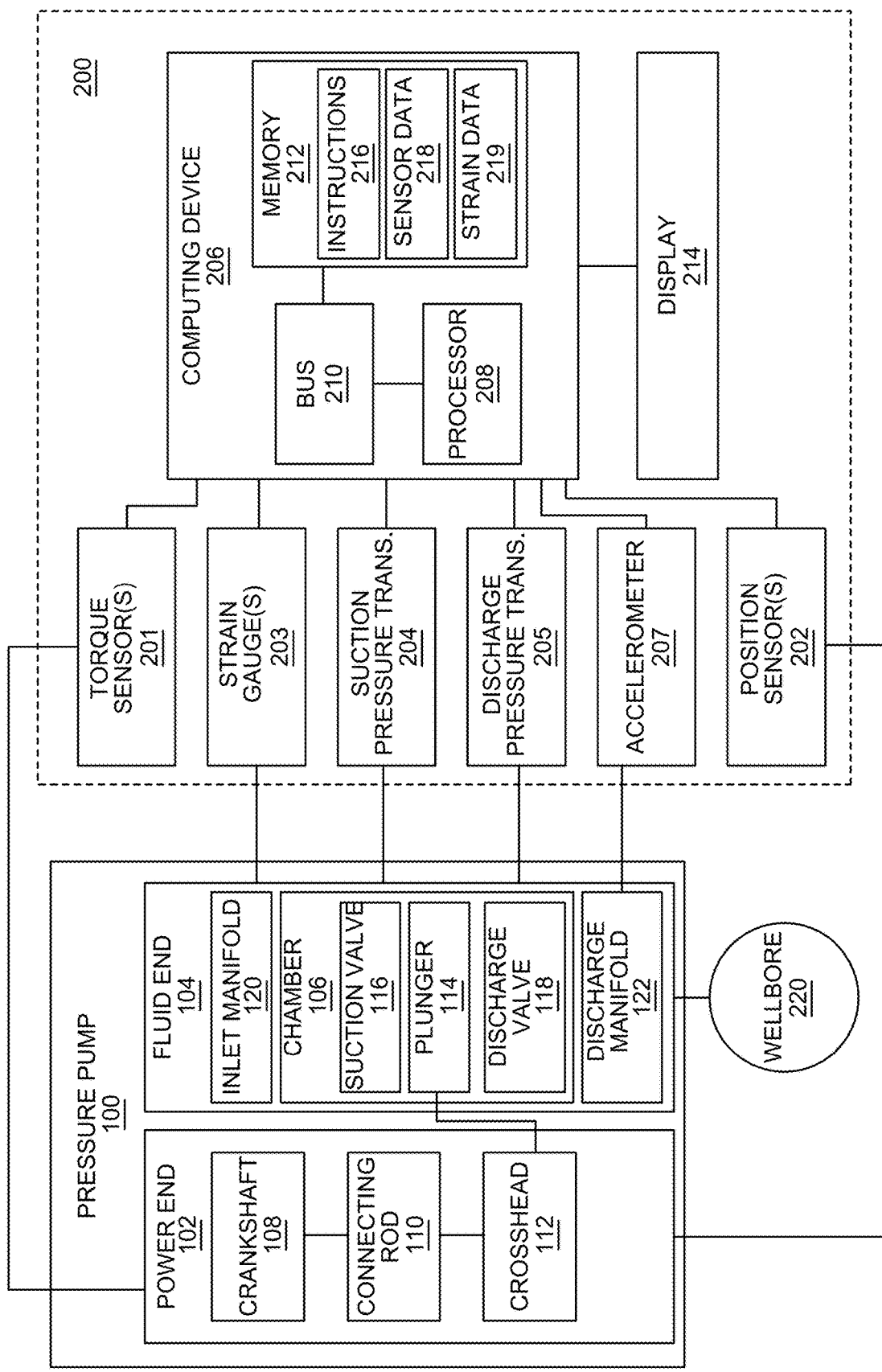
FIG. 2 is a block diagram depicting a pump monitoring system for a pressure pump according to aspects of the present disclosure.

FIG. 2 is a block diagram showing an example of a pump monitoring system 200 coupled to the pressure pump 100. The pump monitoring system 200 includes multiple sensors and a computing device 206. The pump monitoring system may include a torque sensor 201. A position sensor 202 and a strain gauge or strain gauges 203 are coupled to the pressure pump 100. The position sensor 202 may include a single sensor or may represent an array of sensors. The position sensor 202 may be a magnetic pickup sensor capable of detecting ferrous metals in close proximity. The position sensor 202 may be positioned on the power end 102 of the pressure pump 100 for determining the position of the crankshaft 108. In some aspects, the position sensor 202 may be placed proximate to a path of the crosshead 112. In other aspects, the position sensor 202 may be placed on the power end 102 as illustrated by block 126 in FIG. 1A.

The strain gauge 203 is positioned on the fluid end 104 of the pressure pump 100. The strain gauge 203 may include a single gauge or an array of gauges for determining strain in the chamber 106. Non-limiting examples of types of strain gauges may include electrical resistance strain gauges, semiconductor strain gauges, fiber optic strain gauges, microscale strain gauges, capacitive strain gauges, vibrating wire strain gauges, etc. In some aspects, the pump monitoring system 200 may include a strain gauge 203 for each chamber 106 of the pressure pump 100 to determine strain in each of the chambers 106, respectively. In some aspects, the strain gauge 203 is positioned on an external surface of the fluid end 104 of the pressure pump 100 in a position subject to strain in response to stress in the chamber 106. For example, the strain gauge 203 may be positioned on a section of the fluid end 104 in a manner such that when the chamber 106 loads up, strain may be present at the location of the strain gauge 203. The strain gauge 203 may be placed on an external surface of the pressure pump 100 in a location directly over the plunger bore corresponding to the chamber 106 as illustrated by blocks 124 in FIG. 1A to measure strain in the chamber 106. The strain gauge 203 generates a signal representing strain in the chamber 106 and transmits the signal to a processor 208. The pump monitoring system 200 of FIG. 2 includes accelerometer 207, the placement of which is discussed above with respect to FIG. 1B. The pump monitoring system 200 of FIG. 2 also includes the suction pressure transducer 204, discussed above, and the discharge pressure transducer 205, the placement of which is discussed above with respect FIG. 1B. The accelerometer and pressure transducers generate vibration and pressure signals and transmit these signals to processor 208.

The computing device 206 is coupled to the position sensor 202, the strain gauge 203, and the other sensors and transducers. The computing device 206 includes the processor 208, a bus 210, and a memory 212. In some aspects, the pump monitoring system 200 may also include a display unit 214. The processor 208 may execute instructions 216 including one or more operations for identifying failed valves or a failed sensor. The instructions 216 may be stored in the memory 212 coupled to the processor 208 by the bus 210 to allow the processor 208 to perform the operations. The processor 208 may include one processor or multiple processors. Non-limiting examples of the processor 208 may include a Field-Programmable Gate Array ("FPGA"), an application-specific integrated circuit ("ASIC"), a microprocessor, etc.

The non-volatile memory 212 may include any type of memory device that retains stored information when powered off. Non-limiting examples of the memory 212 may include electrically erasable and programmable read-only memory ("EEPROM"), a flash memory, or any other type of non-volatile memory. In some examples, at least some of the memory 212 may include a medium from which the processor 208 can read the instructions 216. A non-transitory, computer-readable medium may include electronic, optical, magnetic or other storage devices capable of providing the processor 208 with computer-readable instructions or other program code (e.g., instructions 216). Non-limiting examples of a computer-readable medium include (but are not limited to) magnetic disks(s), memory chip(s), ROM, random-access memory ("RAM"), an ASIC, a configured processor, optical storage, or any other medium from which a computer processor can read the instructions 216. The instructions 216 may include processor-specific instructions generated by a compiler or an interpreter from code written in any suitable computer-programming language, including, for example, C, C++, C#, etc. In some examples, the computing device 206 determines an input for the instructions 216 based on sensor data 218 and strain data 219 input into the computing device 206. Stored strain data 219 can be acquired by test operation of the pump or finite element analysis.

In some aspects, the computing device 206 may generate interfaces associated with the sensor data 218 and information generated by the processor 208 therefrom to be displayed via a display unit 214. The display unit 214 may be coupled to the processor 208 and may include any CRT, LCD, OLED, or other device for displaying interfaces generated by the processor 208. In some aspects, the display unit 214 may also include audio components. The computing device 206 may generate audible interfaces associated with information generated by the processor 208 (e.g., alarms, alerts, etc.).

In some aspects, in addition to the pump monitoring system 200, the pressure pump 100 may also be coupled to a wellbore 220. For example, the pressure pump 100 may be used in hydraulic fracturing to inject fluid into the wellbore 220. Subsequent to the fluid passing through the chambers 106 of the pressure pump 100, the fluid may be injected into the wellbore 220 at a high pressure to break apart or otherwise fracture rocks and other formations adjacent to the wellbore 220 to release or otherwise stimulate hydrocarbons. The pump monitoring system 200 may monitor the flow of the fluid through the pressure pump 100 to determine the rate of injection of the fluid into the wellbore 220. Although hydraulic fracturing is described here, the pressure pump 100 may be used for any process or environment requiring a positive displacement pressure pump.

Figure 3:
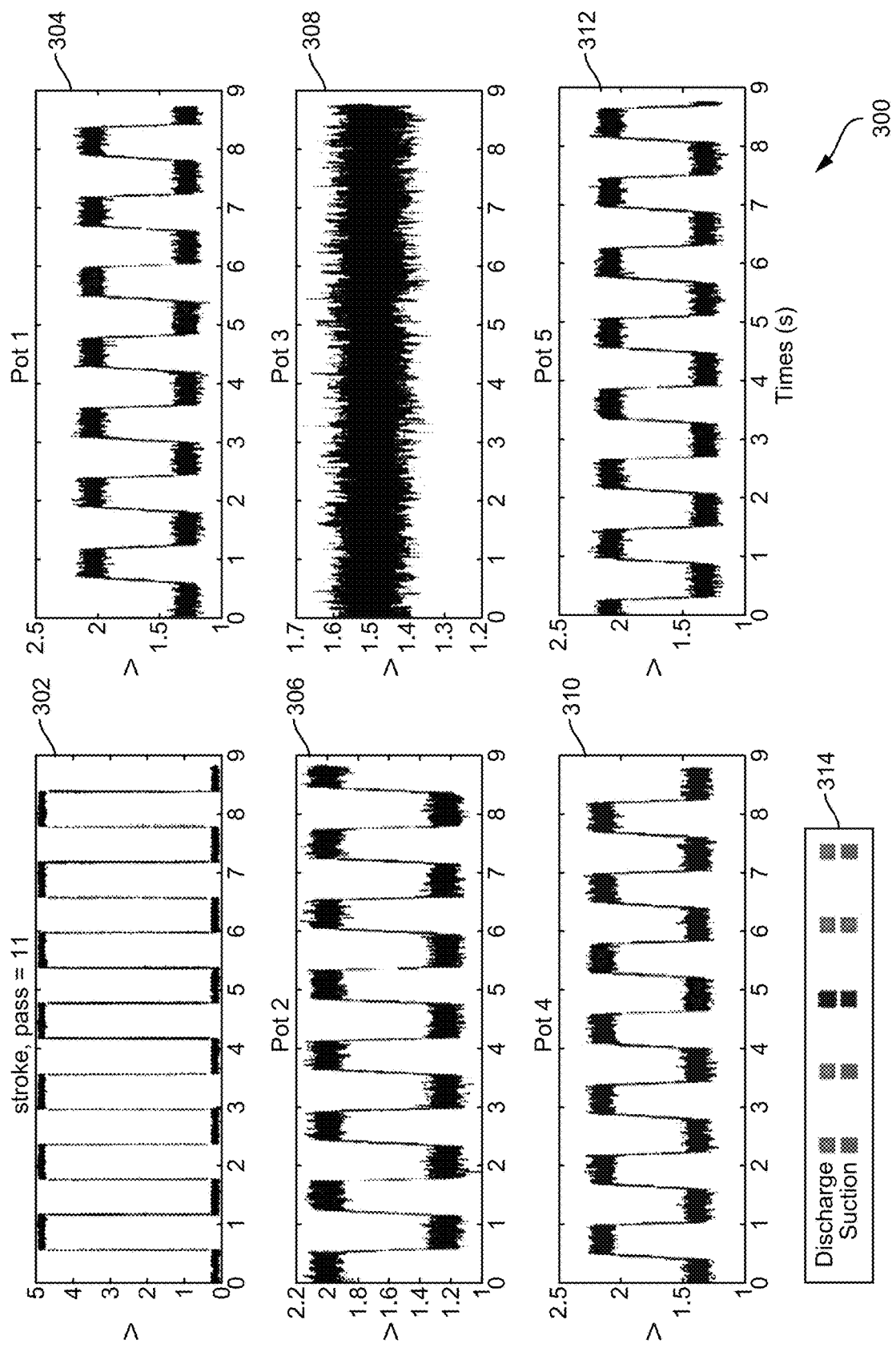
FIG. 3 is a screen shot of an example pump monitoring system interface according to some aspects.

FIG. 3 is a screen shot of an example pump monitoring system interface 300. This interface 300 is for pump monitoring system 200. In this example, the pump monitoring system 200 is connected to a pump with five pump sections ("pots") instead of three pump sections as previously illustrated. In this example, the interface 300 is output to display unit 214 of FIG. 2 by processor 208 of FIG. 2 to provide sensor information to a user. Interface 300 includes seven panels. Panel 302 is a position display provided by position sensor 202 of FIG. 2. This panel shows relative position on the vertical axis and time on the horizontal axis. The position provided is that of a single plunger; however, since all plungers are connected to the same crankshaft, panel 302 provides an overall timing indication of the pump. Panel 304, panel 306, panel 308, panel 310, and panel 312 each show a signal graph of a strain signal from a strain gauge 203 of FIG. 2. The signals are for pot 1, pot 2, pot 3, pot 4, and pot 5, respectively. The strain signal graphs show the strain signal in volts on the vertical axis as related to time on the horizontal axis. The time axes of all signal graphs are aligned. However, the signal graphs are all automatically scaled to show detail and the vertical axes of all signal graphs are automatically adjusted accordingly.

Still referring to FIG. 3, strain signal graphs 304, 306, 310, and 312, all display normal, expected strain for a pump section. The strain changes with the stroke of the pump as indicated by panel 302. However, the strain signal graph shown in panel 308, for pot 3, shows an abnormal strain signal. This abnormal strain signal identifies some failure in pot 3 of the pump. Interface panel 314 is a series of five pairs of status indicators. The displayed pairs of indicators, from left to right, show the status of pot 1, pot 2, pot 3, pot 4, and pot 5. The top indicator of each pair is a status indicator for the discharge portion of the pump section, indicating the status of the discharge valve, and the bottom indicator of each pair is a status indicator for the suction portion of the pump section, indicating the status of the suction valve. In FIG. 3, both status indicators for pot 3 are showing a failure indication, which in a physical display unit may be indicated by color, for example, red. Thus, status display panel 314 of FIG. 3 is indicating a failure in pump section 3, but cannot provide more detail on the type of failure. However, there are some circumstances where additional detail is provided by the status display panel of pump monitoring system interface 300, as described in more detail below.

Figure 4:
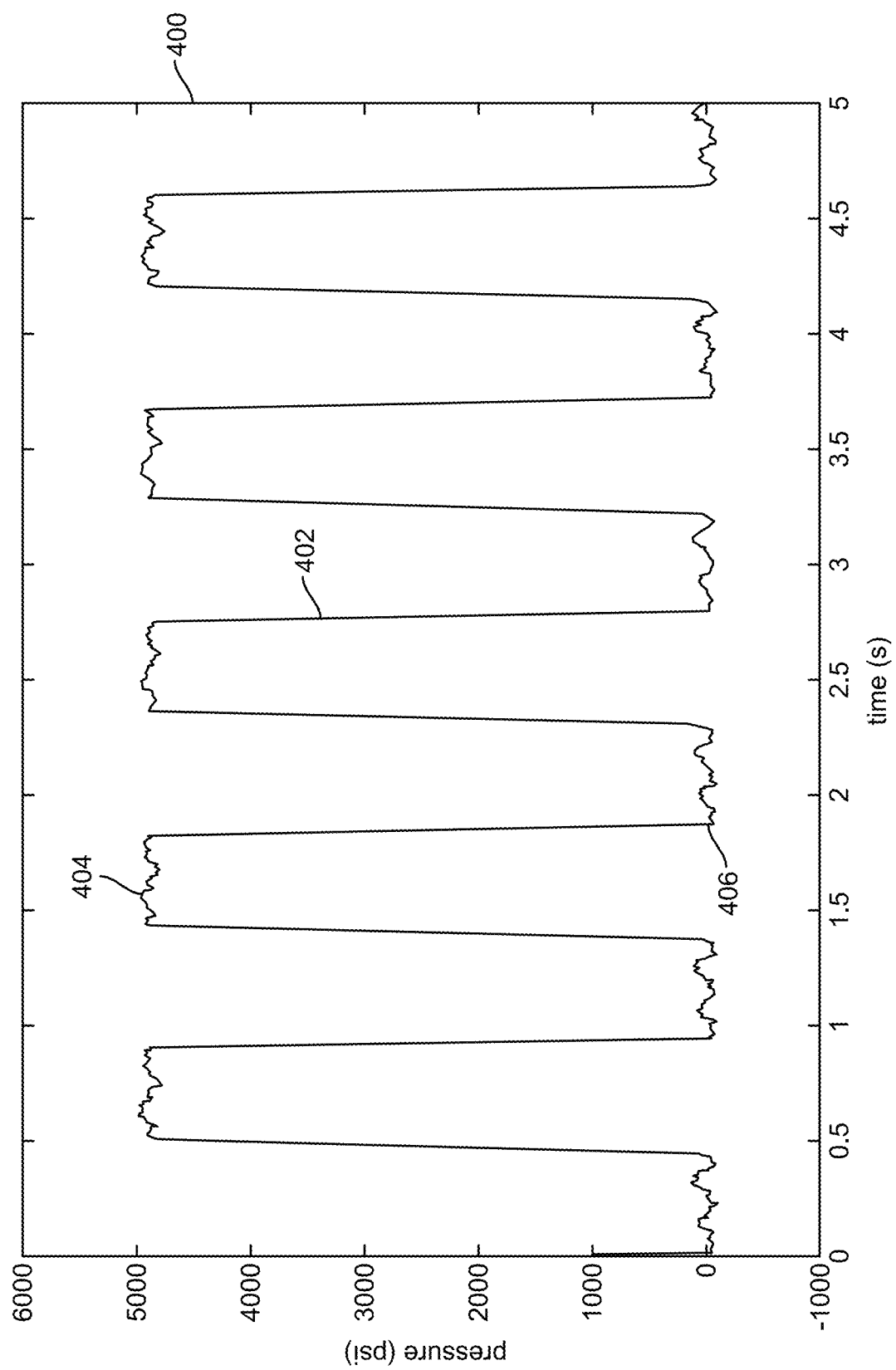
FIG. 4 is a signal graph depicting a waveform representing the internal cylinder pressure of a pump section according to some aspects.

FIG. 4 is a signal graph 400 depicting a waveform representing the internal cylinder pressure of a pump section according to some aspects. This pressure was derived from a strain gauge 203 mounted externally. Pressure in units of psi is plotted on the vertical axis and time in units of seconds is plotted on the horizontal axis. Pressure waveform 402 shows a signal that includes a square wave like component. The upper portion 404 of the square wave of pressure waveform 402 is correlated with the discharge pressure of the pump section, and the lower portion 406 is correlated with the suction pressure of the pump section.

Figure 5:
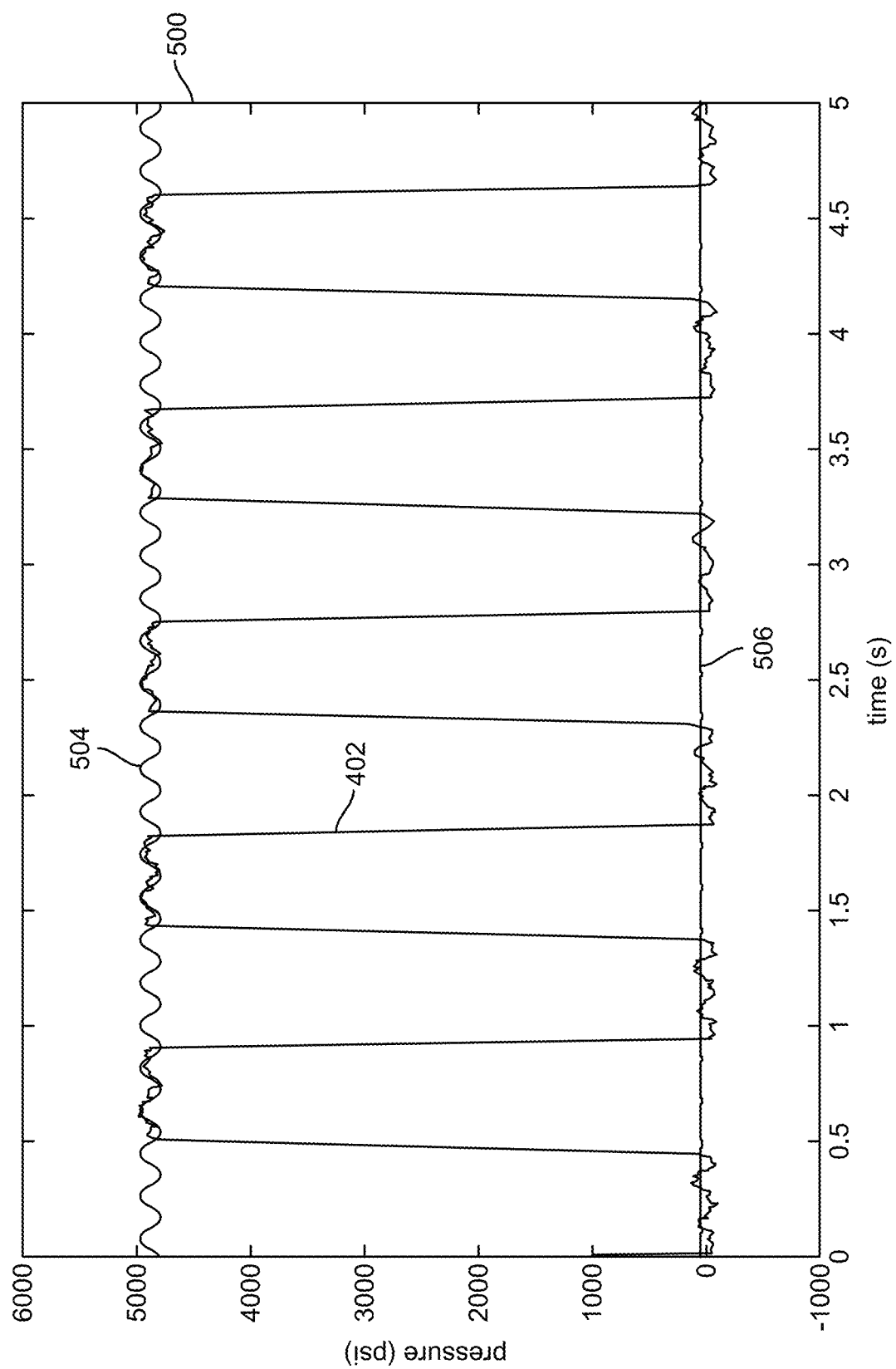
FIG. 5 is a signal graph depicting example waveforms for suction pressure and discharge pressure superimposed over the internal cylinder pressure waveform of FIG. 4 according to some aspects.

FIG. 5 is a signal graph 500 depicting example waveforms for relative suction pressure and discharge pressure as measured by a suction pressure transducer 204 and a discharge pressure transducer 205, respectively. These pressure transducers provide relative pressure over time for each valve in the pump section. These waveforms are superimposed over the internal cylinder pressure waveform 402 of FIG. 4. FIG. 5 shows the relative agreement between the pressure measured in the cylinder as indicated by waveform 402 to both the relative discharge pressure indicated by waveform 504 the relative suction pressure indicated by waveform 506.

The scale of the horizontal and vertical axes of signal graph 500 is the same as that of signal graph 400 of FIG. 4. While the discharge pressure waveform 504 corresponds closely to the discharge pressure portions of the cylinder pressure waveform 402, there are some discrepancies with the correlation of the suction pressure waveform 506 to the chamber pressure waveform. These discrepancies result from measuring the cylinder pressure with an external strain gauge. The external strain gauge also measures the bending of the fluid end of the pump due to the other cylinders. This difference can be avoided by using an actual pressure transducer placed inside the cylinder, negated using averaging and filtering, or corrected using mechanical theory and strain analysis.

Figure 6:
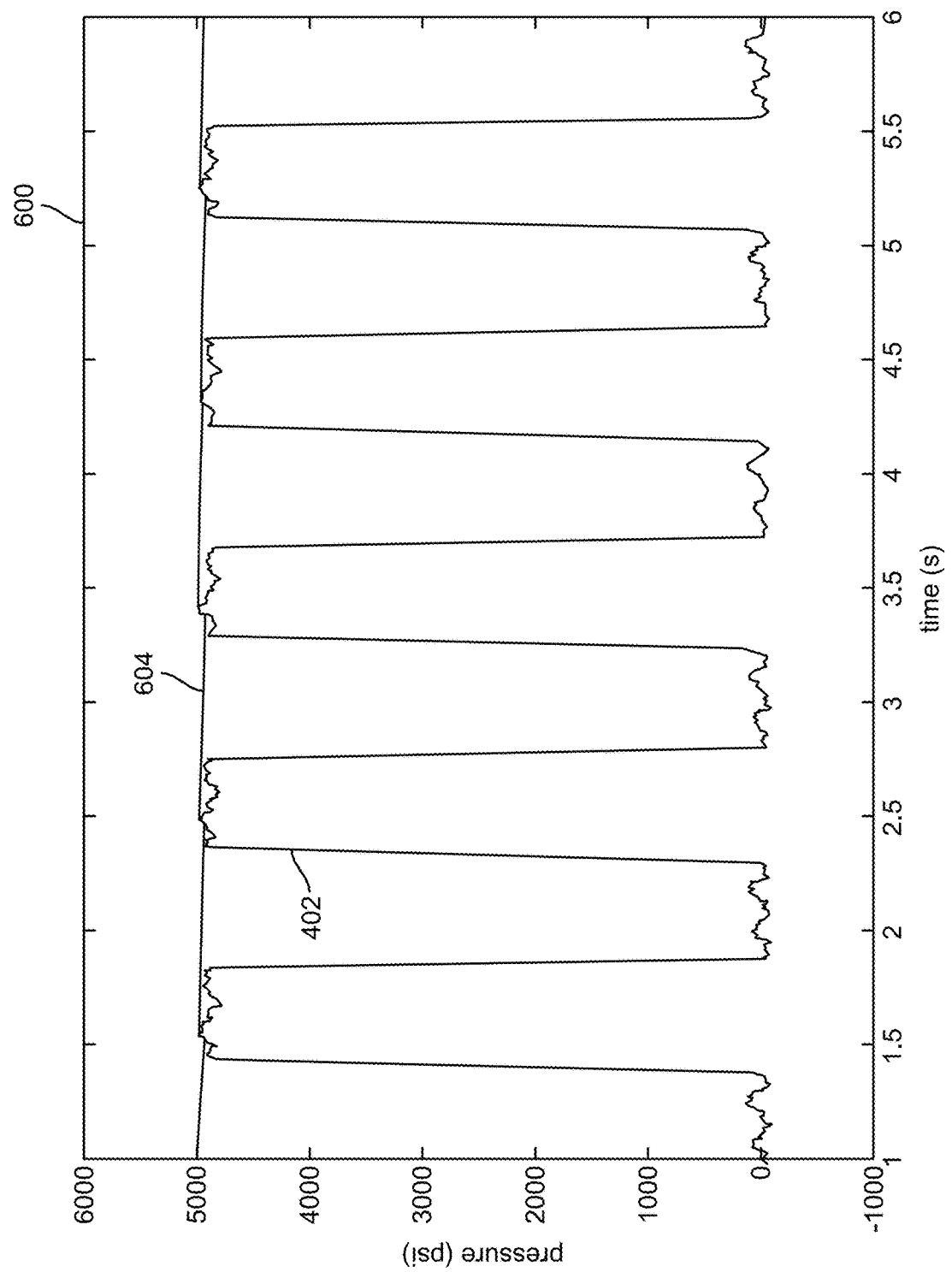
FIG. 6 is a signal graph depicting the output of an envelope filter as applied the cylinder pressure signal waveform of FIG. 4 according to some aspects.

Since, as shown above, the upper portion of the cylinder pressure data trace represents the discharge pressure, an upper envelope of the cylinder pressure signal is a representation of the discharge pressure. Likewise, the lower envelop of the cylinder pressure signal would represent the suction pressure. Thus, the suction and discharge pressures can be derived using an envelope filter, as shown in FIG. 6. FIG. 6 is a signal graph 600 depicting an output of an envelope filter as applied the cylinder pressure signal waveform of FIG. 4. Signal graph 600 shows envelope filter waveform 604 superimposed on cylinder pressure waveform 402, with the same time and pressure scales as shown in FIG. 4. While only the upper envelop (discharge pressure) is shown, the same process can be used to produce a lower envelop (suction pressure). The envelope filters used may be either digital or analog. The enveloping filters should have a rapid response and a slow decay to properly simulate any missing part of the signal.

If higher sample rates are needed for better resolution of the actual pressure, readings from multiple cylinders can be combined. Such an approach requires more sensors, and hence, more expense, as one sensor per pump section would be needed, however, in some pump monitoring systems the sensors may already be present for other purposes. For the analysis presented with respect to FIGS. 7-14, it can be assumed that multiple strain signals are combined. In some aspects, the strain signals from all cylinders in the pump are used.

Figure 7:
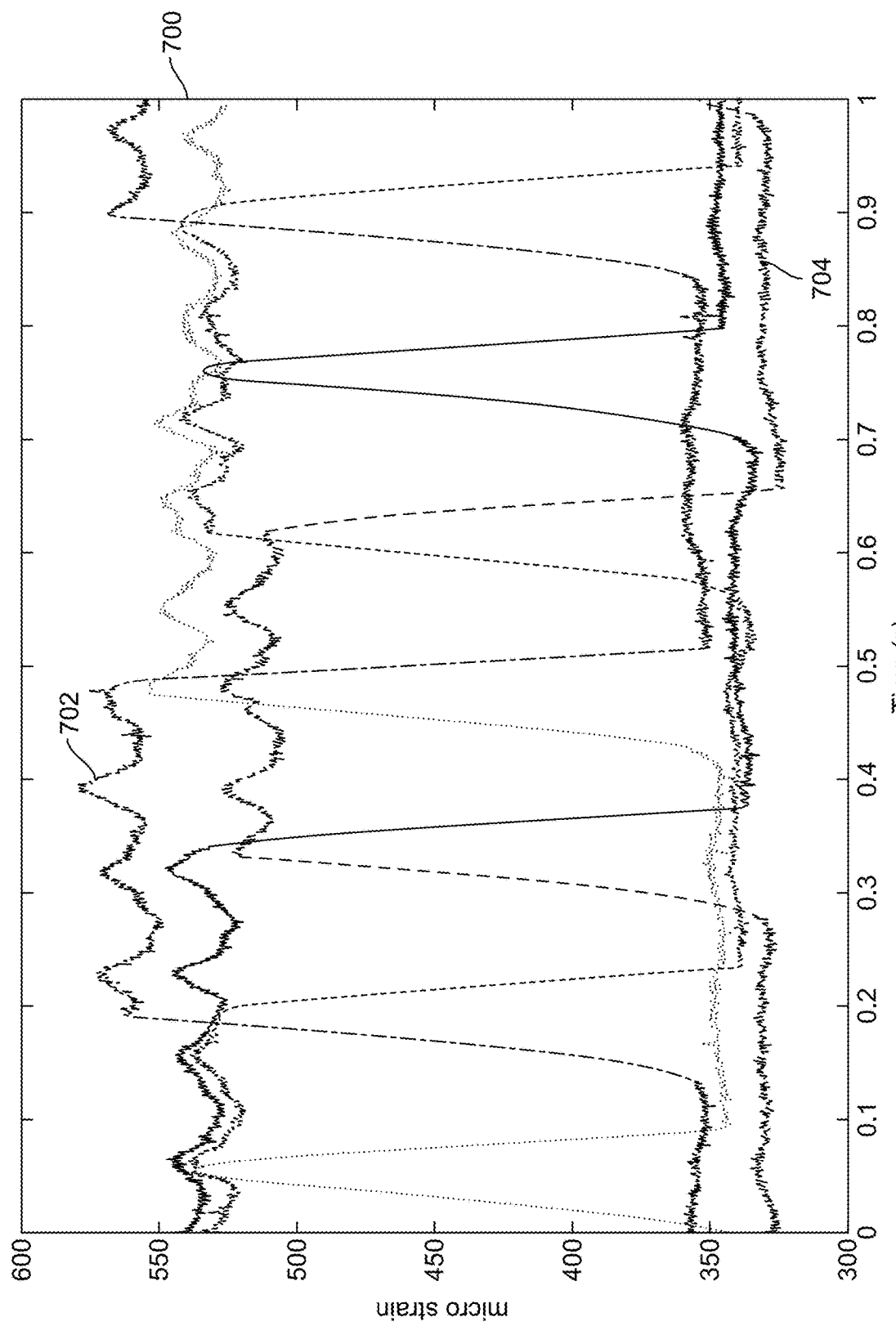
FIG. 7 is a signal graph showing strain signals from strain gauges representing strain in several cylinders of a pump according to some aspects.
Figure 8:
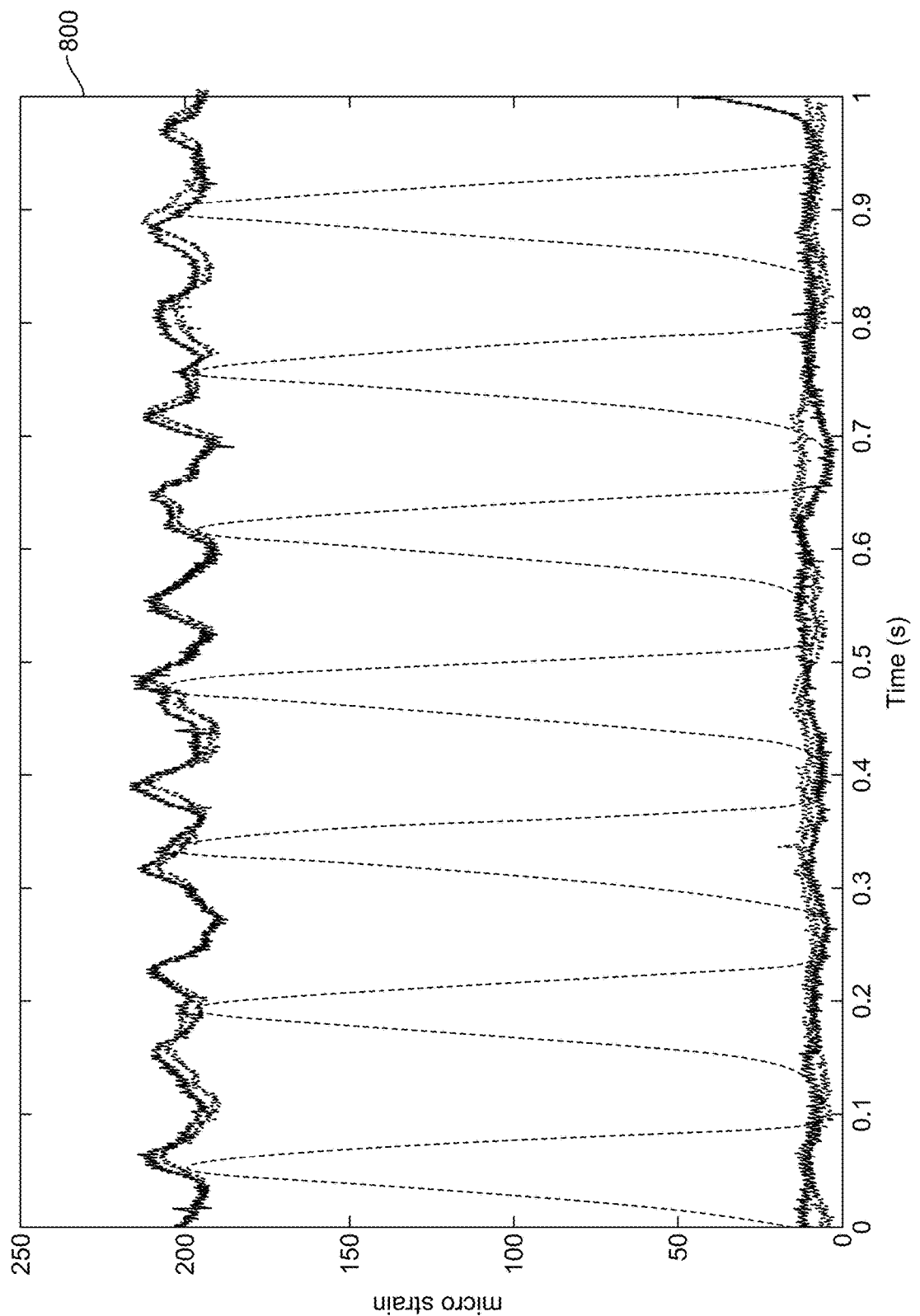
FIG. 8 is a signal graph depicting the resultant strain signals after the strain signals in FIG. 7 have been aligned and zeroed.

FIG. 7 is a signal graph 700 showing strain signals from strain gauges representing strain in several cylinders of a pump according to some aspects. These signals represent strain while the pump is in operation. This strain data needs to be offset due to using non-zeroed strain gauges for these measurements. As an example, strain signal 702 has maximum values that are higher than the other strain signals. Similarly, strain signal 704 has minimum values that are lower than the other strain signals. FIG. 8 is a signal graph 800 in which the strain signals from FIG. 7 have been aligned and zeroed.

Figure 9:
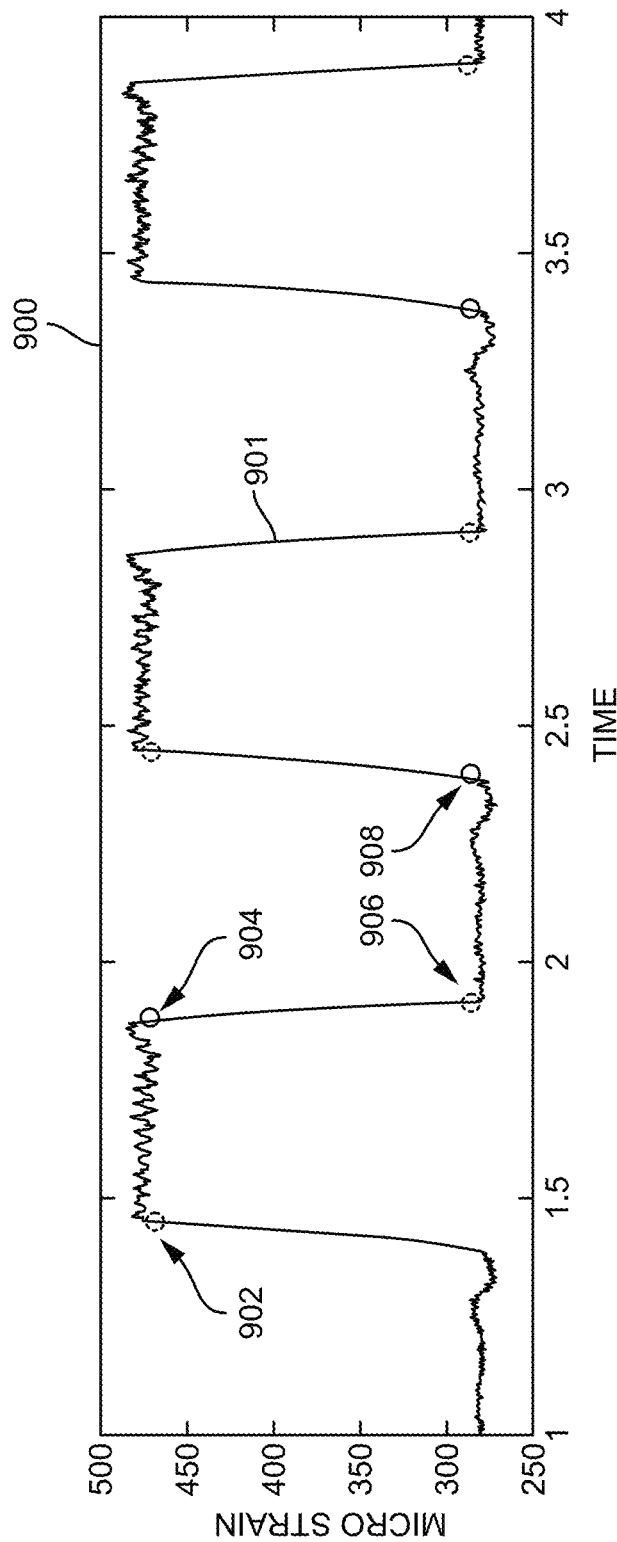
FIG. 9 is a signal graph showing a scaled strain signal that exhibits valve actuation points according to some aspects of the disclosure.

FIG. 9 shows how the strain data can be separated using the valve actuation points for both the suction and discharge valves. More specifically, the strain signal is separated into a suction strain signal and a discharge strain signal. FIG. 9 shows the location of these actuation points on an example waveform. Once the points are known the discharge strain is the portion of the signal in between the discharge opening and discharge closing points. Similarly, the suction portion is bracketed by the suction opening and suction closing points. FIG. 9 shows signal graph 900 with a raw strain signal 901 generated by a strain gauge coupled to the fluid end of a pressure pump and positioned on an external surface. For purposes of this discussion it can be assumed this pressure pump is being monitored by pump monitoring system 200. The strain signal 901 represents strain measured by the strain gauge 203. The computing device 206 can determine the actuation points 902, 904, 906, and 908 of the suction valve and the discharge valve for the pump section based on the strain signal 901. The actuation points 902, 904, 906, and 908 represent the points in time where the suction valve and the discharge valve open and close. For example, the computing device 206 may execute the instructions 216 stored in the memory 212 and including signal-processing algorithms to determine the actuation points 902, 904, 906, and 908. For example, the computing device 206 may execute instructions 216 to determine the actuation points 902, 904, 906, and 908 by determining discontinuities in the strain signal 901. The stress in the chamber changes during the operation of the suction valve and the discharge valve to cause the discontinuities in the strain signal 901 during actuation of the valves and the computing device 206 can identify the discontinuities as the opening and closing of the valves. In one example, the strain in the chamber is isolated to the fluid in the chamber when the suction valve is closed. The isolation of the strain causes the strain in the chamber to load up until the discharge valve is opened. When the discharge valve is opened, the strain levels off until the discharge valve is closed, at which point the strain unloads until the suction valve is reopened. The discontinuities may be present when the strain signal 901 shows a sudden increase or decrease in value corresponding to the actuation of the valves.

In FIG. 9, actuation point 902 represents the discharge valve opening, actuation point 904 represents the discharge valve closing, actuation point 906 represents the suction valve opening, and actuation point 908 represents the suction valve closing again to resume the cycle of fluid into and out of the chamber. In some aspects, the computing device 206 may cause the display unit 214 to display the strain signal 901 and the actuation points 902, 904, 906, and 908 as shown in FIG. 9. The exact magnitudes of strain in the chamber determined by the strain gauge 203 may not be required for determining the actuation points 902, 904, 906, and 908. The computing device 206 may determine the actuation points 902, 904, 906, and 908 based on the strain signal 901 providing a characterization of the loading and unloading of the strain for the chamber.

Figure 10:
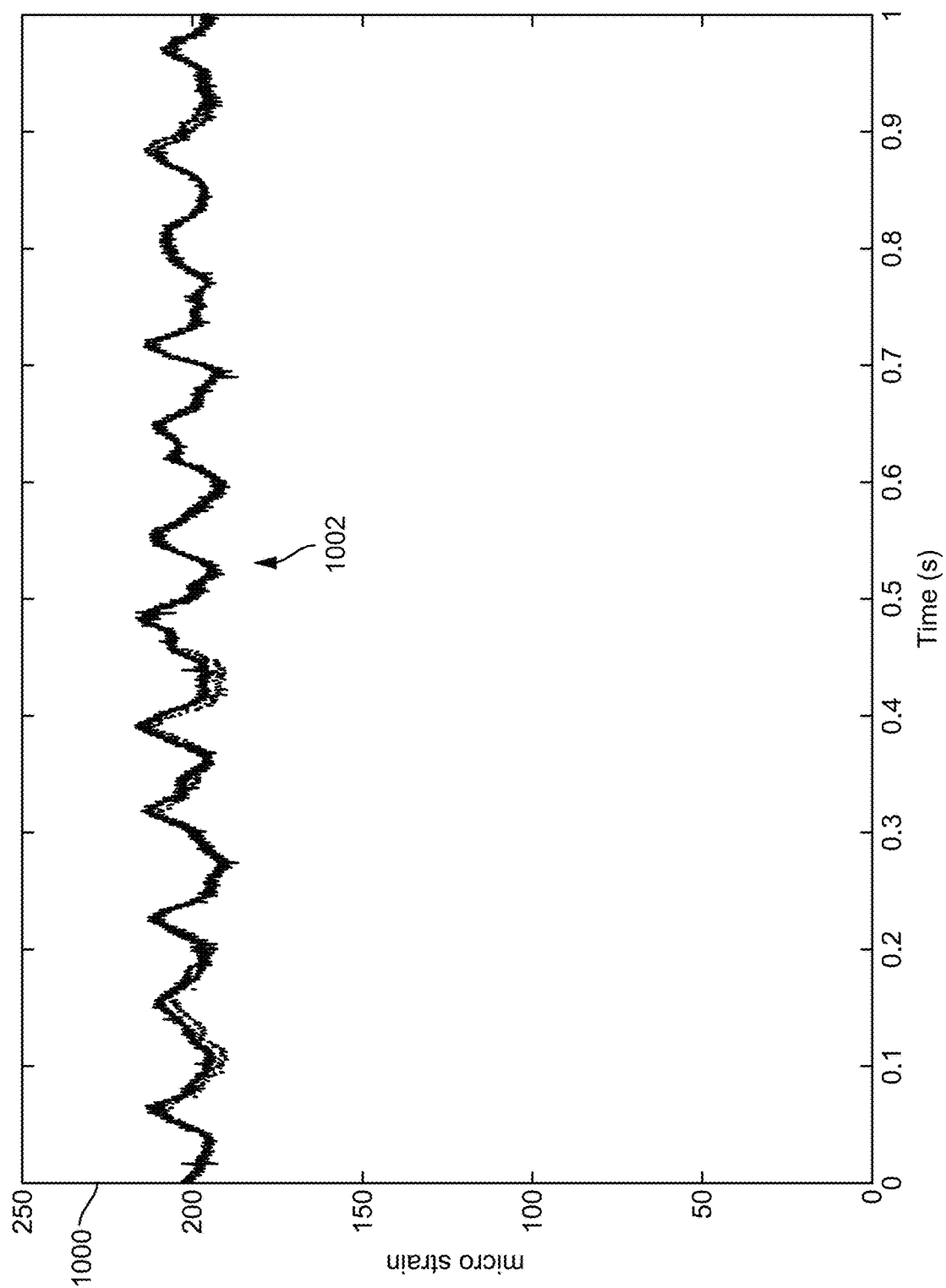
FIG. 10 is a signal graph showing discharge strain signals for several cylinders of a pump according to some aspects.
Figure 11:
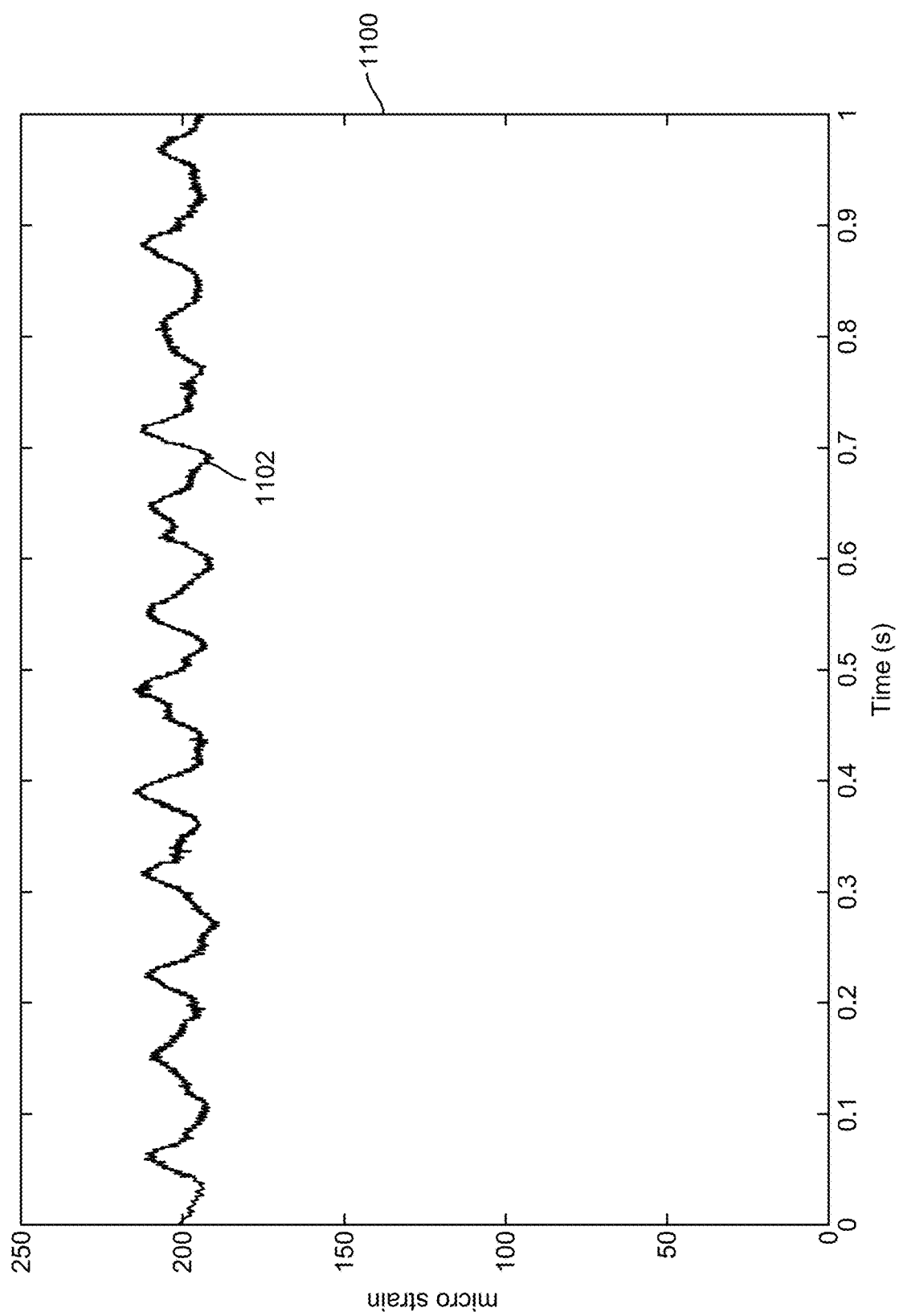
FIG. 11 is a signal graph showing a combined discharge strain signal according to some aspects of the disclosure.

FIG. 10 is a signal graph 1000 showing discharge strain signals 1002 for several cylinders of a pump. These may then be combined to produce a continuous discharge strain signal. FIG. 11 is a signal graph 1100 showing a combined discharge strain signal 1102. Strain signal 1102 can be correlated to pressure in various ways, such as testing, the use of a finite element analysis (FEA) model, or by correlating it to the actual suction and discharge pressures as described herein.

Figure 12:
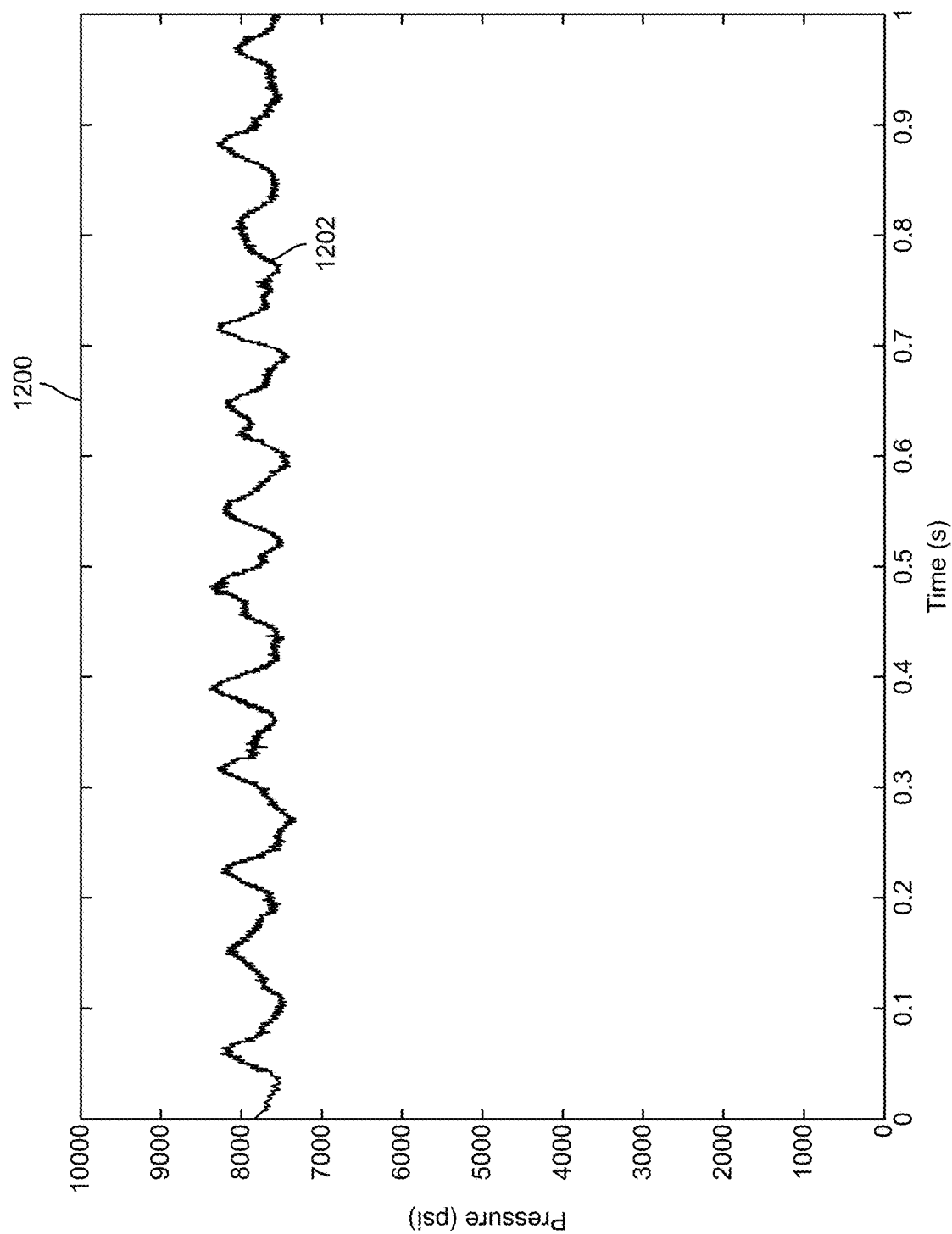
FIG. 12 is a signal graph showing discharge pressure associated with a discharge valve in a pump section as obtained by correlating a strain signal to discharge pressure according to some embodiments of the disclosure.

The method described above can be used by computing device 206 to derive the continuous discharge pressure signal of FIG. 12. FIG. 12 is a signal graph 1200 showing a pressure signal 1202, which represents a discharge pressure associated with a discharge valve in a pump section as obtained by correlating a strain signal to discharge pressure. The same process is also used to derive the suction pressure. Suction pressure results will typically be of lower resolution than the discharge pressure results due to the reduced magnitudes experienced during the suction portion of the pump stroke. While the above method demonstrates the concept of how the measured cylinder strains from the pump monitoring system can be correlated to theoretical pressure, the strains can also be directly correlated to the measured pressures, eliminating FEA modeling or other theoretical correlations, since two measured points are available to adjust the offset and slope of the strain signals. The correlation between pressure and strain is used to translate the signal of FIG. 11 into the signal of FIG. 12.

Figure 13:
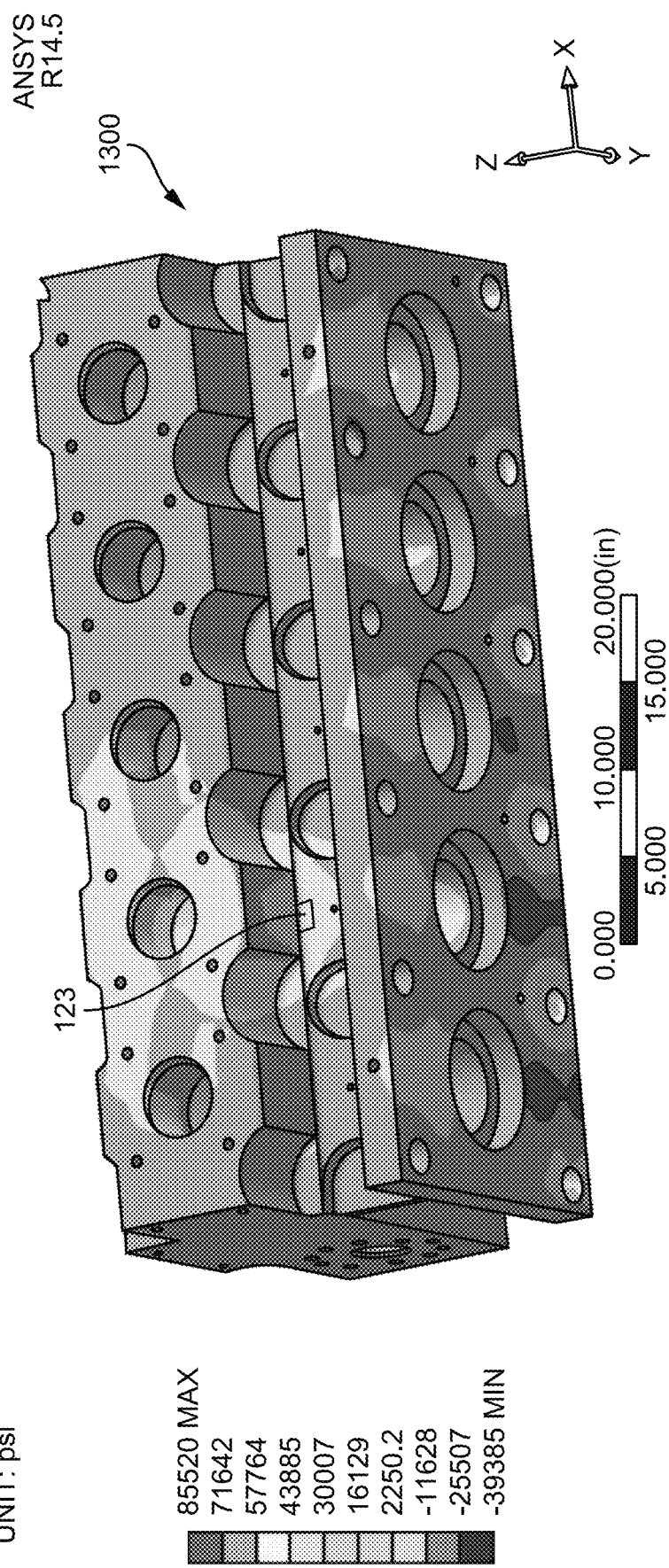
FIG. 13 is an example of a finite element model used to determine normal strain values for a pump being monitored by the pump monitoring system according to some aspects.

When a valve fails in a pump like that shown in FIG. 1A and FIG. 1B, the strain or pump pressure signal will become the level of either the discharge pressure or the suction pressure. The processor needs to keep stored strain values for each strain sensor in order to use the current strain value to derive current pressure using the strain signal. These values can be acquired during a test operation of the pump when all valves are known to be in good working order. Alternatively, these values can be derived from FEA modeling data. FIG. 13 is an example of a finite element model 1300 that can be used for the correlation discussed previously, or to ascertain strain values, which can then be stored in memory 212. In FIG. 13, block 123, the placement point for the discharge pressure transducer is also shown.

Figure 14:
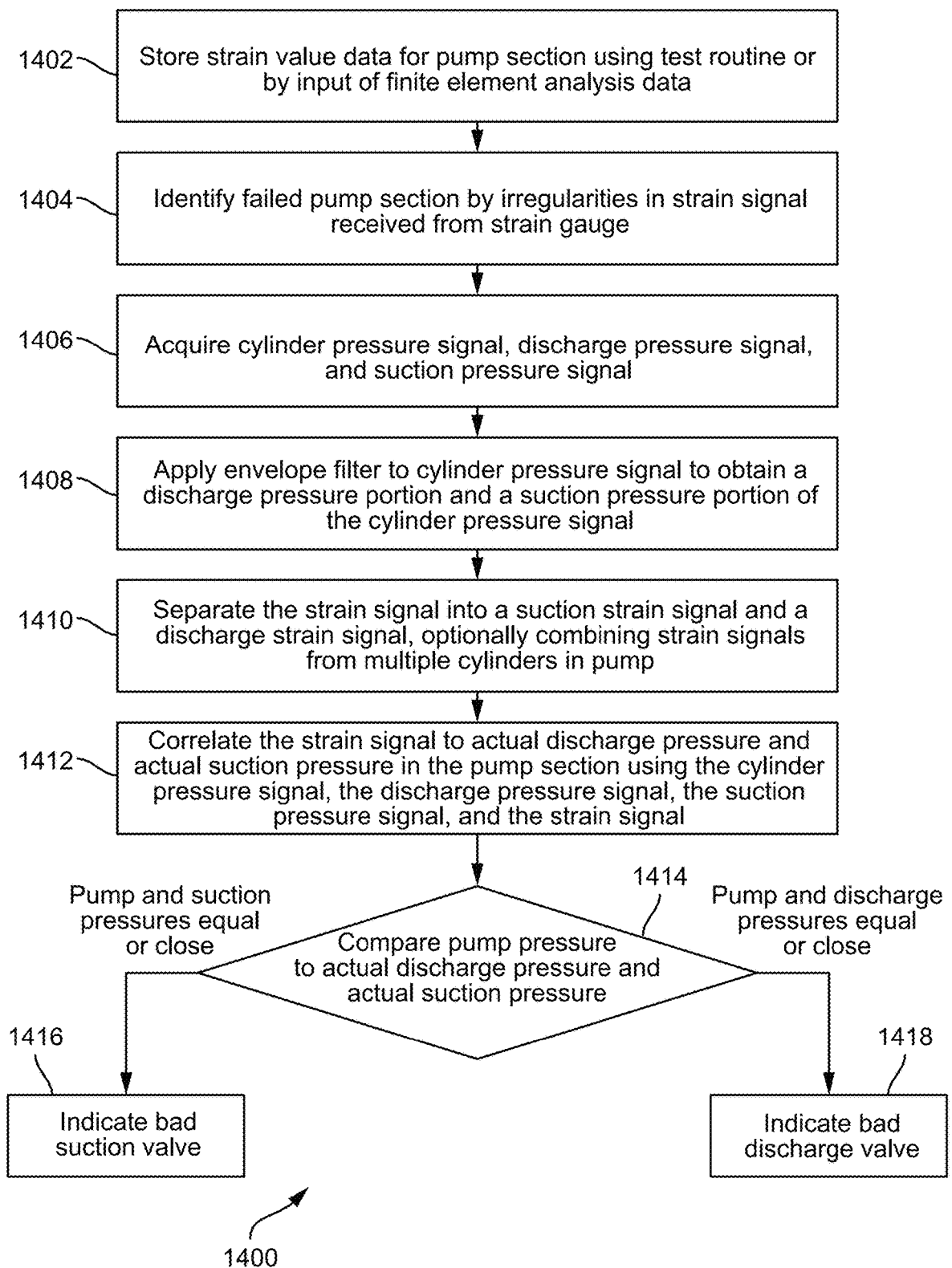
FIG. 14 is a flowchart illustrating the process executed by a pump monitoring system to specifically identify a failed valve in a section of a pump according to some aspects of this disclosure.

FIG. 14 is a flowchart illustrating the process 1400 executed by the pump monitoring system 200 of FIG. 2 to specifically identify a failed valve in a section of a pump according to embodiments of this disclosure. Process 1400 makes use of at least some of the processing techniques illustrated in FIGS. 4-12. At block 1402, the monitoring system acquires and stores strain value data for the pump. This strain value data is stored in memory 212 as strain data 219. At block 1404, the system identifies a failed pump section by detecting irregularities in the strain signal received from a strain gauge 203. At block 1406, the computing device 206 of the pump monitoring system acquires the cylinder pressure from the strain signal. The computing device 206 also acquires the relative suction pressure, and the relative discharge pressure. The relative suction and discharge pressures are acquired from pressure transducers 204 and 205. At block 1408 computing system 206 applies an envelope filter to the cylinder pressure signal as illustrated in FIG. 5 and FIG. 6 to obtain a discharge pressure portion and a suction pressure portion of the cylinder pressure signal. At block 1410 of FIG. 14, the computing device 206 separates the strain signal from the section into a suction strain signal and a discharge strain signal. This separation can be accomplished by detecting actuation points as shown in FIG. 9. To increase resolution, signals from multiple cylinders can be combined as illustrated in FIG. 10 and FIG. 11. At block 1412, the computing device 206 correlates the strain signal to actual pressures associated with the specific valves, such as the corresponding manifold pressures, in the pump section using the pressure signals. In the case of the discharge valve, the strain signal is correlated to an actual discharge pressure in the pump section using a discharge pressure signal. In the case of the suction valve, the strain signal is correlated to an actual suction pressure in the pump section using the suction pressure signal.

Still referring to FIG. 14, at block 1414, the pump monitoring system compares the current pump pressure to the actual discharge pressure and actual suction pressure as determined above. If the pump pressure corresponds to an actual pressure of one of the valves in the pump section in question, a specific valve failure is indicated. If the pump pressure is equal to or very close to the suction pressure, a bad suction valve is indicated at block 1416. If the pump pressure is equal to or very close to the discharge pressure, a bad discharge valve is indicated at block 1418. These indications can be displayed on display unit 214, and a specific display technique will be discussed below with respect to FIG. 17. In a multi-section pump like the example pump of FIGS. 1A and 1B, the pump pressure may be the section pressure for the section in question. For a single section pump, the terms "pump pressure" and "section pressure" are synonymous.

Figure 15:
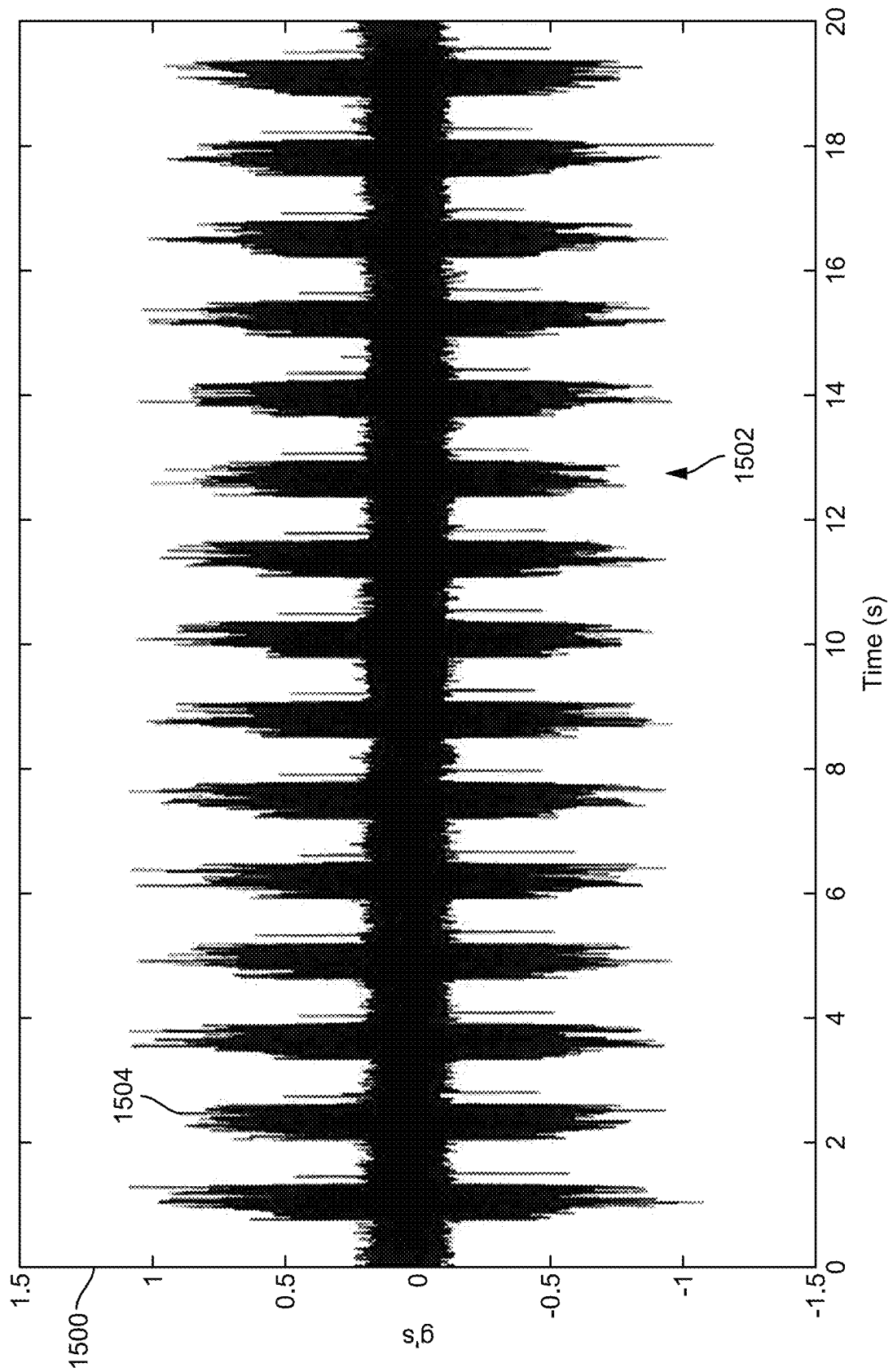
FIG. 15 is signal graph of an output of a vibration sensor attached to a pump section as obtained by a pump monitoring system according to some aspects.

FIG. 15 is signal graph 1500 of an output signal 1502 of a vibration detector, in this example accelerometer 207, attached to a pump section. Signal 1502 has square wave components as suggested by the regular upper and lower magnitude spikes. Thus, signal 1502 has an operational signal component, as one can appreciate by taking note of square-wave-like signal graphs previously discussed. Point 1504 indicates a possible leaky valve, though the possible leaky valve would likely be first detected by the valve failure determination method previously discussed. Referring to the pump monitoring system interface of FIG. 3, panel 308 for pot 3 indicates an irregularity in the strain gauge signal as previously discussed. Since the accelerometer attached to pot 3 produces a signal with operational signal components, it is very likely that the strain gauge, the sensor in this case, is reading properly. If the operational signal were missing, it would be an indication that the stain gauge is defective or has come loose from its mounting. The addition of the accelerometer and appropriate computer program code to process the vibration signal in the pump monitoring system provides two independent methods for detecting a valve failure. If these two methods disagree, a sensor failure is strongly suspected and can be programmatically indicated.

Figure 16:
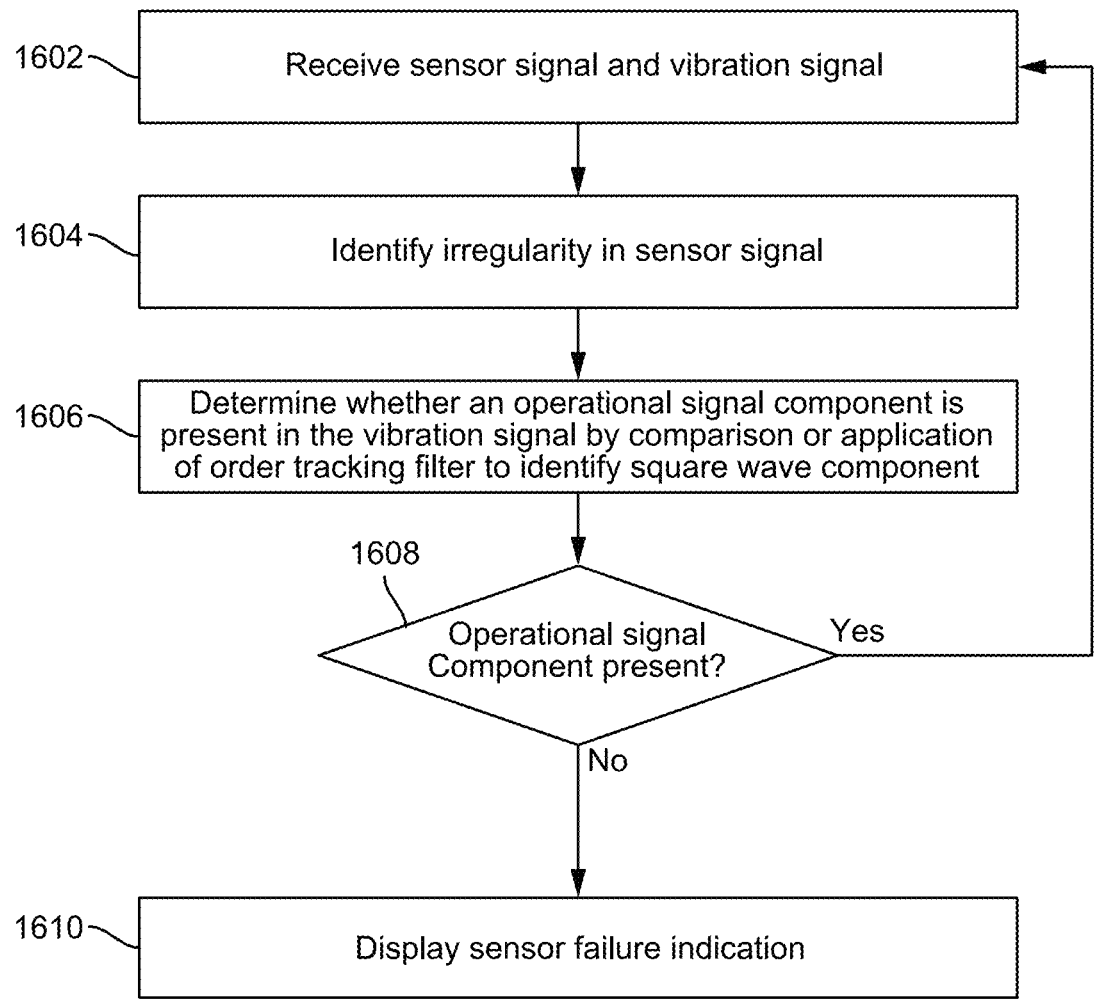
FIG. 16 is a flowchart illustrating the process executed by a pump monitoring system to specifically identify a failed sensor in a section of a pump according to some aspects of this disclosure.

FIG. 16 is a flowchart illustrating the process 1600 executed by a pump monitoring system to specifically identify a failed sensor in a section of a pump according to embodiments of this disclosure. At block 1602, the computing device 206 receives both a sensor signal and a vibration signal. The vibration signal comes from accelerometer 207. At block 1604, the computer device 206 identifies an irregular sensor signal, such as an irregular signal from a strain gauge as previously discussed. At block 1606, a determination is made as to whether an operational signal component is present in the vibration signal from the accelerometer. If not, at block 1608, a sensor failure indication is displayed on display unit 214 at block 1610. Otherwise, processing continues with signals continuing to be received and analyzed.

Although an accelerometer is given as an example, a vibration detector can be any sensor, gauge, or transducer from which a vibration signal can be derived. Such a sensor includes not only an accelerometer, but also an acoustic transducer, vibration transducer, or a torque transducer. The torque transducer can be used to estimate angle of twist of certain drivetrain structural (torsion) components, the variation of speed of rotational drivetrain components, or directly measure the torque in the drivetrain. For a torque transducer to be used as a vibration detector, it should be placed at the torque input for a pump section. The operational signal component that is used to determine the validity of failure indications can be a similar to a square wave, but with advanced signal processing techniques readily available other types of signal components could be used. If a square wave is to be detected, it can be detected by applying an order tracking filter to identify the square wave component. A square wave component could also be detected by comparing the vibration signal to a signal from a strain gauge, as both the noise signature and square wave signature would typically be similar from these two sensors.

Any of the above techniques can be used to separately confirm a valve failure and indicate a sensor failure if the valve failure cannot be confirmed. However, the methodology may need to be changed to match the sensing technique for specific types or models of pumps or for empirical models based on measurements, data and baselines. In each case the measurement would confirm the failure read by the pump monitoring system or it could indicate a problem with the integrity of the readings and alert an operator that maintenance of a sensor is required.

Figure 17:
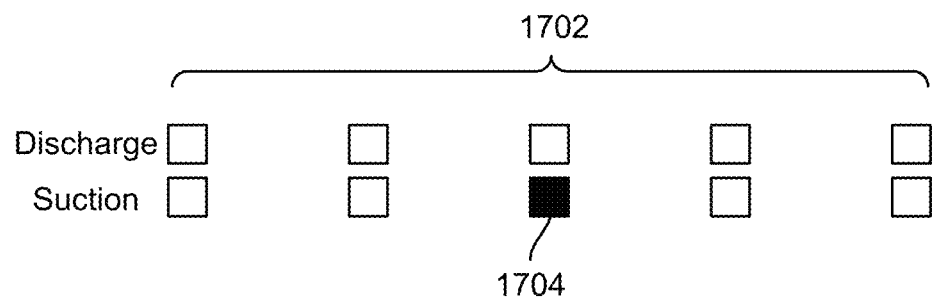
FIG. 17 is a detailed view of a portion of an interface like that shown in FIG. 3, but indicating a specific valve failure according to examples of aspects of the disclosure.

FIG. 17 is a detailed view of a portion of an interface like panel 314 of FIG. 3, but indicating a specific valve failure according to the valve failure determination techniques described herein. FIG. 17 includes pairs of virtual indicator "lights" 1702 in two rows, the top row representing a discharge valve status and the bottom row representing a suction valve status. Each pair represents the status of the valves in a pot. Indicator light 1704 is displayed as darkened, though in an actual system a distinctive color might instead be used. Indicator light 1704 indicates a problem with the suction valve for pot 3.

Figure 18:
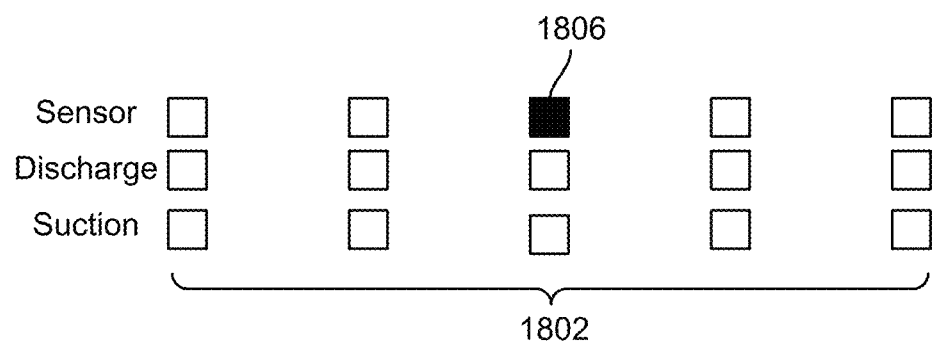
FIG. 18 is a detailed view of a portion of an interface like that shown in FIG. 3, but indicating a strain sensor failure according to examples of aspects of the disclosure.

FIG. 18 is a detailed view of a portion of an interface like panel 314 of FIG. 3, but with additional "lights" for indicating a sensor failure as discussed above. FIG. 18 includes triplets of virtual indicator "lights" 1802 in three rows, the top row representing strain sensor status, the middle row representing discharge valve status, and the bottom row representing a suction valve status. Each triplet represents the status for a specific pot. Indicator light 1806 is displayed as darkened, though in an actual system a distinctive color might be used. It would also be possible to have a display like that shown in FIG. 17 and just turn both indicators a specific color to indicate a sensor issue. In this example, indicator light 1806 indicates a problem with the strain gauge for pot 3.

In some aspects, pump monitoring systems are provided according to one or more of the following examples:

As used below, any reference to a series of examples is to be understood as a reference to each of those examples disjunctively (e.g., "Examples 1-4" is to be understood as "Examples 1, 2, 3, or 4").

Example #1: A pump monitoring system for use in wellbore operations includes a sensor on a fluid end of a pump to measure properties associated with the pump and provide a sensor signal and a vibration detector positionable to measure vibration associated with the pump and provide a vibration signal. A computing device is couplable to the sensor and the vibration detector and includes a processor for which instructions executable by the processor are used to cause the processor to receive the sensor signal and the vibration signal, identify an irregularity in the sensor signal, determine, by processing the vibration signal, whether an operational signal component is present in the vibration signal, and display an indication that the sensor has failed when the operational signal component is absent from the vibration signal.

Example #2: The pump monitoring system of example 1, wherein the instructions are executable to detect a square wave like component in the vibration signal.

Example #3: The pump monitoring system of example(s) 1 or 2, wherein the instructions are executable to apply an order tracking filter to the vibration signal to detect the square wave like component.

Example #4: The pump monitoring system of example(s) 1-3 wherein the instructions are executable to correlate the vibration signal to a strain signal.

Example #5: The pump monitoring system of example(s) 1-4 wherein the vibration detector comprises an accelerometer.

Example #6: The pump monitoring system of example(s) 1-5 wherein the vibration detector comprises an acoustic or vibration transducer.

Example #7: The pump monitoring system of example(s) 1-6 wherein the vibration detector comprises a torque transducer positionable at a torque input for a pump section that includes the sensor.

Example #8: A method of identifying a failed sensor includes receiving, by a processor, a sensor signal from a sensor in or on a fluid end of a pump, and a vibration signal from a vibration detector, identifying, by the processor, an irregularity in the sensor signal, determining, by the processor, whether an operational signal component is present in the vibration signal, and displaying, by the processor, an indication that the sensor has failed when the operational signal component is absent from the vibration signal.

Example #9: The method of example 8 further comprising detecting a square wave like component in the vibration signal.

Example #10: The method of example(s) 8 or 9 further comprising applying an order tracking filter to the vibration signal to detect the square wave like component.

Example #11: The method of example(s) 8-10 further comprising comparing the vibration signal to a strain signal.

Example #12: The method of example(s) 8-11 wherein the vibration detector comprises an accelerometer.

Example #13: The method of example(s) 8-12 wherein the vibration detector comprises an acoustic or vibration transducer.

Example #14: The method of example(s) 8-13 wherein the vibration detector comprises a torque transducer positionable at a torque input for a pump section that includes the sensor.

Example #15: A non-transitory computer-readable medium that includes instructions that are executable by a processor for causing the processor to identify a failed sensor in a pump associated with a wellbore, by performing operations including receiving a sensor signal from a sensor in or on a fluid end of a pump, and a vibration signal from a vibration detector, identifying an irregularity in the sensor signal, determining whether an operational signal component is present in the vibration signal, and displaying an indication that the sensor has failed when the operational signal component is absent from the vibration signal.

Example #16: The computer-readable medium of example 15, wherein the operational signal component comprises a square wave like component in the vibration signal.

Example #17: The computer-readable medium of example(s) 15 or 16, wherein the operations further comprise applying an order tracking filter to the vibration signal.

Example #18: The computer-readable medium of example(s) 15-17, wherein the operations further comprise comparing the vibration signal to a strain signal.

Example #19: The computer-readable medium of example(s) 15-18 wherein the vibration detector comprises an accelerometer or an acoustic or vibration transducer.

Example #20: The computer-readable medium of example(s) 15-19 wherein the vibration detector comprises a torque transducer positionable at a torque input for a pump section that includes the sensor.

Example #21: A pump monitoring system for use in wellbore operations including a sensor on a fluid end of a pump to provide a sensor signal, a vibration detector positionable to measure vibration and provide a vibration signal, and a computing device couplable to the sensor and the vibration detector. The computing device includes a processor for which instructions executable by the processor are used to cause the processor to receive the sensor signal and the vibration signal, identify an irregularity in the sensor signal, determine, by processing the vibration signal, whether an operational signal component is present in the vibration signal, and display an indication that the sensor has failed when the operational signal component is absent from the vibration signal.

Example #22: The pump monitoring system of example 21, wherein the instructions are executable to detect a square wave like component in the vibration signal.

Example #23: The pump monitoring system of example(s) 21 or 22, wherein the instructions are executable to apply an order tracking filter to the vibration signal to detect the square wave like component.

Example #24: The pump monitoring system of example(s) 21-23, wherein the instructions are executable to correlate the vibration signal to a strain signal.

Example #25: The pump monitoring system of example(s) 21-24 wherein the vibration detector comprises an accelerometer.

Example #26: The pump monitoring system of example(s) 21-25 wherein the vibration detector comprises an acoustic or vibration transducer.

Example #27: The pump monitoring system of example(s) 21-26 wherein the vibration detector comprises a torque transducer positionable at a torque input for a pump section that includes the sensor.

Example #28: A method of identifying a failed sensor includes receiving, by a processor, a sensor signal from a sensor in or on a pump, receiving, by the processor, a vibration signal from a vibration detector, identifying, by the processor, an irregularity in the sensor signal, determining, by the processor, whether an operational signal component is present in the vibration signal, and displaying, by the processor, an indication that the sensor has failed when the operational signal component is absent from the vibration signal.

Example #29: The method of example 28 further comprising detecting a square wave like component in the vibration signal.

Example #30: The method of example(s) 28 or 29 further comprising applying an order tracking filter to the vibration signal to detect the square wave like component.

Example #31: The method of example(s) 28-30 further comprising comparing the vibration signal to a strain signal.

Example #32: The method of example(s) 28-31 wherein the vibration detector comprises an accelerometer.

Example #33: The method of example(s) 28-32 wherein the vibration detector comprises an acoustic or vibration transducer.

Example #34: The method of example(s) 28-33 wherein the vibration detector comprises a torque transducer positionable at a torque input for a pump section that includes the sensor.

Example #35: A non-transitory computer-readable medium that includes instructions that are executable by a processor for causing the processor to perform the method of example(s) 28-34.

The foregoing description of the examples, including illustrated examples, has been presented only for the purpose of illustration and description and is not intended to be exhaustive or to limit the subject matter to the precise forms disclosed. Numerous modifications, combinations, adaptations, uses, and installations thereof can be apparent to those skilled in the art without departing from the scope of this disclosure. The illustrative examples described above are given to introduce the reader to the general subject matter discussed here and are not intended to limit the scope of the disclosed concepts.

What is claimed is:

1. A pump monitoring system for use in wellbore operations, comprising:
a strain sensor on a fluid end of a pump to measure properties associated with the pump and provide a strain signal;
a vibration detector positionable to measure vibration associated with the pump and provide a vibration signal; and
a computing device couplable to the strain sensor and the vibration detector, the computing device including a processor for which instructions executable by the processor are used to cause the processor to:
receive the strain signal and the vibration signal;
identify an irregularity in the strain signal corresponding to a potential strain sensor failure;
determine, by processing the vibration signal, that an operational signal component corresponding to an irregularity in the pump function is not present in the vibration signal, corresponding to a failure of the strain sensor that indicates that the strain sensor is disconnected from the pump; and
display an indication that the strain sensor has failed in response to determining that the operational signal component is absent from the vibration signal.

2. The pump monitoring system of claim 1, wherein the instructions are executable to detect a square wave like component in the vibration signal.

3. The pump monitoring system of claim 2, wherein the instructions are executable to apply an order tracking filter to the vibration signal to detect the square wave like component.

4. The pump monitoring system of claim 2, wherein the instructions are executable to correlate the vibration signal to a strain signal.

5. The pump monitoring system of claim 1 wherein the vibration detector comprises an accelerometer.

6. The pump monitoring system of claim 1 wherein the vibration detector comprises an acoustic or vibration transducer.

7. The pump monitoring system of claim 1 wherein the vibration detector comprises a torque transducer positionable at a torque input for a pump section that includes the strain sensor.

8. A method of identifying a failed strain sensor in a wellbore, the method comprising:
receiving, by a processor, a strain signal from a strain sensor in or on a fluid end of a pump, and a vibration signal from a vibration detector;
identifying, by the processor, an irregularity in the strain signal corresponding to a potential strain sensor failure;
determining, by the processor, that an operational signal component corresponding to an irregularity in the pump function is not present in the vibration signal, corresponding to a failure of the strain sensor that indicates that the strain sensor is disconnected from the pump; and
displaying, by the processor, an indication that the strain sensor has failed in response to determining that the operational signal component is absent from the vibration signal.

9. The method of claim 8 further comprising detecting a square wave like component in the vibration signal.

10. The method of claim 9 further comprising applying an order tracking filter to the vibration signal to detect the square wave like component.

11. The method of claim 9 further comprising comparing the vibration signal to a strain signal.

12. The method of claim 8 wherein the vibration detector comprises an accelerometer.

13. The method of claim 8 wherein the vibration detector comprises an acoustic or vibration transducer.

14. The method of claim 8 wherein the vibration detector comprises a torque transducer positionable at a torque input for a pump section that includes the strain sensor.

15. A non-transitory computer-readable medium that includes instructions that are executable by a processor for causing the processor to identify a failed strain sensor in a pump associated with a wellbore, by performing operations comprising:
receiving a strain signal from a strain sensor in or on a fluid end of a pump, and a vibration signal from a vibration detector;
identifying an irregularity in the strain signal corresponding to a potential strain sensor failure;
determining that an operational signal component corresponding to an irregularity in the pump function is not present in the vibration signal, corresponding to a failure of the strain sensor that indicates that the strain sensor is disconnected from the pump; and
displaying an indication that the strain sensor has failed in response to determining that the operational signal component is absent from the vibration signal.

16. The non-transitory computer-readable medium of claim 15, wherein the operational signal component comprises a square wave like component in the vibration signal.

17. The non-transitory computer-readable medium of claim 16, wherein the operations further comprise applying an order tracking filter to the vibration signal.

18. The non-transitory computer-readable medium of claim 16, wherein the operations further comprise comparing the vibration signal to a strain signal.

19. The non-transitory computer-readable medium of claim 15 wherein the vibration detector comprises an accelerometer or an acoustic or vibration transducer.

20. The non-transitory computer-readable medium of claim 15 wherein the vibration detector comprises a torque transducer positionable at a torque input for a pump section that includes the strain sensor.

* * * * *